(12) United States Patent
Downham

(10) Patent No.: US 12,017,719 B1
(45) Date of Patent: Jun. 25, 2024

(54) BICYCLE TRAVEL CASE

(71) Applicant: John Downham, Superior, CO (US)

(72) Inventor: John Downham, Superior, CO (US)

( * ) Notice: Subject to any disclaimer, the term of this patent is extended or adjusted under 35 U.S.C. 154(b) by 105 days.

(21) Appl. No.: 17/900,452

(22) Filed: Aug. 31, 2022

(51) Int. Cl.
| | |
|---|---|
| *B62H 3/02* | (2006.01) |
| *B65D 25/10* | (2006.01) |
| *B65D 81/05* | (2006.01) |
| *B65D 85/68* | (2006.01) |

(52) U.S. Cl.
CPC ............... *B62H 3/02* (2013.01); *B65D 25/10* (2013.01); *B65D 81/05* (2013.01); *B65D 85/68* (2013.01); *B65D 2585/6862* (2013.01)

(58) Field of Classification Search
CPC .......... A45C 11/00; A45C 5/14; A45C 13/02; A45C 13/04; B62H 3/02; B62H 3/04; B62H 3/10; B62H 2700/00; B62H 2700/005; B62J 11/00; B62J 11/04; B62J 19/00; B62J 23/00; B65D 25/10; B65D 85/68; B65D 2585/686; B65D 2585/6862; B65D 2585/6865
USPC ................... 206/315.1, 335; 280/47.34, 79.2
See application file for complete search history.

(56) References Cited

U.S. PATENT DOCUMENTS

| | | | | |
|---|---|---|---|---|
| 624,320 A | * | 5/1899 | Freckleton | B65D 9/14 217/38 |
| 2,311,514 A | * | 2/1943 | Bramblett | B60J 11/00 296/136.1 |
| 3,886,988 A | * | 6/1975 | Garrett | B62J 19/00 206/335 |
| 4,353,464 A | | 10/1982 | Bentler | |
| 4,756,416 A | * | 7/1988 | Johnson | B62J 19/00 206/335 |
| 4,792,039 A | * | 12/1988 | Dayton | B65D 85/68 206/335 |
| 4,991,715 A | * | 2/1991 | Williams | B62J 19/00 206/335 |
| 5,520,280 A | | 5/1996 | Lickton | |
| 5,669,497 A | * | 9/1997 | Evans | B65D 85/68 248/176.1 |
| 6,040,764 A | * | 3/2000 | Crisci | B62J 19/00 70/57.1 |

(Continued)

FOREIGN PATENT DOCUMENTS

| | | | | |
|---|---|---|---|---|
| DE | 202015102012 U1 | * | 8/2015 | ............ A45C 11/00 |
| WO | 2014/003629 A1 | | 1/2014 | |

*Primary Examiner* — Joshua E Rodden

(57) ABSTRACT

An improved bicycle travel case for protecting a partially disassembled bicycle during storage and travel. A skeletal tubular inner framework forms a rigid perimeter defining a shape of the case and is foldable for storage. The framework has an upper and lower section, joined with a hinged connection and a self-latching connection. Mesh panels are installed within planar surfaces defined by the framework, creating impact resistant surfaces encircling the case. A removable fabric cover encloses the inner framework and mesh panel assemblage. Upon removal of the fabric cover for inspection during airline travel, the bicycle is on prominent visual display beneath its protective framework and mesh case, nullifying the need to open the case and physically handle it. The bicycle is releasably locked in the case by two fork mounts that isolate the bicycle from damaging forces. A releasably lockable mount also secures bicycle wheels inside the case.

19 Claims, 16 Drawing Sheets

(56) References Cited

U.S. PATENT DOCUMENTS

| | | | |
|---|---|---|---|
| 6,244,399 B1* | 6/2001 | Birkestrand | A45C 5/14 |
| | | | 190/114 |
| 8,196,740 B2 | 6/2012 | Jacques et al. | |
| 8,505,932 B1* | 8/2013 | Piccirillo | B62K 27/02 |
| | | | 280/30 |
| 9,446,896 B2 | 9/2016 | Pelegrin | |
| 10,144,578 B2 | 12/2018 | Chen et al. | |
| 10,745,183 B2* | 8/2020 | Allen | B60B 7/068 |
| 10,766,691 B2 | 9/2020 | Barker | |
| 11,292,541 B2* | 4/2022 | Dooling | B62J 19/00 |
| 2004/0130117 A1* | 7/2004 | Lipton | B62K 27/006 |
| | | | 280/204 |
| 2010/0230311 A1* | 9/2010 | Jacques | A45C 13/02 |
| | | | 206/335 |
| 2015/0266664 A1* | 9/2015 | Noer | A45C 13/02 |
| | | | 206/216 |
| 2018/0044103 A1* | 2/2018 | Gustavsson | A45C 13/103 |
| 2019/0218809 A1* | 7/2019 | Pearson | B62H 3/04 |
| 2021/0000234 A1* | 1/2021 | Kax | B62H 3/02 |

\* cited by examiner

BICYCLE TRAVEL CASE

TECHNICAL HELD

This application relates to luggage, more specifically to a protective travel case for bicycles.

BACKGROUND

Cycling is a popular sport, and many people travel to participate in events, races and touring holidays. This often involves airline travel, both domestically, and internationally.

This is inherently difficult, given the delicate and cumbersome nature of bicycles. Often, athletes have machines customized to their unique needs, and such bicycles are thus very expensive, and difficult to replace if damaged. Modern materials, such as the popular carbon fiber commonly used for frames and wheels are strong for their intended purpose, but very easily damaged by impact. Other components, such as derailleurs, brakes, and shifting levers are also very delicate. Bicycles vary widely in size, style, configuration and usage, so travel cases must be able to accommodate these differences.

Airline travel with bicycles is especially difficult, due to the need to disassemble the bicycle to a significant extent for packaging in the travel cases currently available, the very rough and frequent nature of luggage handling during airport transit, and the additional mandatory requirement of the contents needing to be inspected by TSA.

Current travel cases for bicycles are of two types. A hard-shell type, such as Bentler, U.S. Pat. No. 4,353,464, offers good impact protection, but are bulky and cumbersome, both in use and during storage when not in use. They also require extensive disassembly to pack the bicycle inside them, and reassembly upon arrival, a time intensive and frustrating process given that workshop facilities are normally not nearby. Bicycles are often customized extremely precisely to an athlete's body geometry, and disassembly and reassembly introduces the risk of injury during sporting events.

Hard sided cases also present the problem of making it difficult not to exceed the 50 lb. baggage limit when fully packed with a bicycle. Luggage exceeding this weight is subject to overweight fees by airlines. Other examples of hard-shell cases include Chuang, U.S. Pat. No. 10,329,083 B1, and Pelegrin, U.S. Pat. No. 9,446,896 B2.

A soft sided bag such as Jacques et at U.S. Pat. No. 8,196,740 B2, Williams U.S. Pat. No. 4,991,715, and Garrett et at U.S. Pat. No. 3,886,988 normally allow for a more compact storage size than a hard shell when not in use, but a much lower level of protection to its contents during travel. Additionally, a lot of airlines now require travelers using a soft-sided bag to sign a waiver, releasing the airline from liability for damages during handling.

Additional problems occur due to TSA having to open each case for inspection, as most cases require a large amount of the bicycle to be disassembled for it to pack inside, necessitating additional packaging and wrapping of individual components that is both time intensive, wasteful of non-recyclable materials, and inconveniences TSA Officers attempting to be expedient in their purpose. Having opened the bicycle case, the contents are often disturbed by TSA officials to facilitate inspection. Damage due to this, and subsequent careless repacking and closing of the case is also a common occurrence. Instances of cases not being closed properly and the contents suffering irreparable damage during further transit have also been reported.

A need has therefore arisen for a travel case for bicycles that offers high levels of protection when traveling. Its structure and sizing should be configured in such a way that it can accommodate a minimally disassembled bicycle in a manner that is conducive to airline luggage weight restrictions. A reduced storage size when not in use, or for shipping to the finishing point of bicycle events, would be of benefit to its users.

SUMMARY OF THE EMBODIMENTS

It is therefore a particular aim to provide a bicycle transport case that has the following advantages for one or more aspects; high levels of protection in a lightweight structure, adaptability to encompass a variety of bicycle sizes and type with minimal disassembly of the bicycle, while obviating the problems further caused by detailed inspection of the contents of the bicycle transport case during airline travel prevalent in the prior art.

To this end the bicycle transport case is designed with an inner framework of a substantially rectangular shape of a predetermined size to encompass a range of bicycle frame sizes, with bicycle wheels removed, and handlebars still installed. This provides a rigid skeletal structure, with a plurality of mesh panels installed in the planar surfaces bounded by the inner framework. Thus, a substantially rigid sided structure is produced.

On top of this arrangement is a cover that is completely removable, thereby allowing uninhibited visual inspection of the bicycle during airline travel, while still providing significant levels of protection during this process by maintaining the integrity of the inner framework and mesh panel assemblage. This feature produced by one or more aspects of the case obviates the need to unpack and physically handle the contents of the bicycle travel case to facilitate inspection during airline travel.

The mesh panels are tensioned so that they provide impact resistant surfaces surrounding the inner contents of the travel case and offer significantly increased levels of protection compared to soft sided bags. The density of the mesh grillwork provides significantly less deflection under impacting forces than fabric sides alone, and further provide a support structure beneath the fabric cover, wherein the fabric only spans between the open spaces in the mesh panels.

To facilitate installation of the bicycle frame and wheels within the inner framework and comply with airline regulations requiring it to be openable, the framework is divided into an upper and lower section, with a hinged connection allowing rotational opening and a latching connection to produce a structure that remains closed until opened. The latching connection is self-latching, so that simply rotating the upper and lower sections of the inner framework to a contiguous closed position guarantees the case is latched shut.

The inner framework is formed from a pair of substantially vertical rectangular arrangements of tubing orientated in a non-parallel arrangement and linked by a plurality of horizontal cross struts. The non-parallel arrangement provides a compact case that still avows a minimally disassembled bicycle to be contained within it. These substantially rectangular arrangements are further divided into the upper and lower sections with tubing defining the contiguous plane between them.

Hinged connections at the midpoint of the horizontal cross struts and where their extremities join the vertical rectangular arrangements permits the case to be folded into a much-reduced horizontal width for storage. Separating the upper and lower sections from each other also provides a much-reduced storage size.

A pair of mounts is installed in the lower section of the inner framework to releasably engage a front fork and a rear fork of the bicycle securely. At least one of these mounts incorporates slidable adjustment to accommodate a large range of bicycle frame sizes. Springs incorporated into the mounts isolate the bicycle from damaging vertical forces exerted on the case.

The mounts further include rotational arrangements that prevent forces caused by the case being thrown sideways being transferred to the bicycle frame and forks by allowing the entire bicycle to pivot vertically left and right about the axis formed between the fork mounts. Tether lines connected to the bicycle handlebar limit and dampen this rotational movement.

Given the delicate nature of modern bicycles, fixed mounts not incorporating these features would subject the bicycle components to forces they are not designed to withstand, with a high likelihood of damage. Releasably lockable means also secure the forks to the mounts, thereby preventing the bicycle being removed from the inner framework, even if the upper section is unlatched and pivotally opened during airline luggage inspection.

A further feature is that the bicycle wheels are installed on a lockable skewer arrangement spanning horizontally between the rails of the lower section of the inner framework. The bicycle wheels are installed with spacers to position them along this skewer such that they are prevented from contacting and damaging themselves or the bicycle frame. This also maintains the visual clarity of the interior of the case compared to installing a pocket or bag arrangement to contain them. Additionally, it also provides a crush resistant strut spanning horizontally at mid height and mid length of the case.

Further crush resistant struts are included within the substantially vertical rectangular arrangements to decrease the effective span of the tubular frameworks, increasing their resistance to loads from horizontal and vertical directions.

DETAILED DESCRIPTION OF SPECIFIC EMBODIMENTS

I identified a particular problem that all prior art bicycle travel cases do not solve. They all must be opened to allow for detailed inspection of their contents by TSA officials during airport transit. Prior art cases do not enable inspection in a manner that is intuitive and quick, while also eliminating handling and physical manipulation of delicate components to expedite this. A second problem is then caused, in that by having to open the case to inspect its contents, the protection offered by the case is compromised.

It is an object of the first embodiment to provide a superior means of traveling with a bicycle, particularly when used for airline travel.

Several advantages of one or more aspects are as follows:
1. A bicycle travel case that is lightweight, collapses in size significantly for storage unlike a hard-shell case and offers a much-increased level of crush resistance and impact protection compared to current soft sided designs.
2. Minimal disassembly of the bicycle to use the case, saving time, reducing the risk of damage during transit and inspection, and injury to the athlete from reassembly error.
3. A case consisting of an inner skeleton frame and mesh netting system that provides high levels of impact protection, crush resistance and shear strength, and a fabric layer surrounding this that TSA agents open to inspect the contents. Upon removal of the lightweight fabric cover, the entirety of the inside of the case is on prominent display for full inspection and the bicycle is still fully protected.
4. Anti-tamper mounting systems for the bicycle frame and bicycle wheels that lock components in place, preventing removal of the contents if the case is opened during inspection, and self-closing latches guaranteeing complete protection in further transit. This makes the case compliant with airline regulations mandating the case to be openable, while eliminating the problems of prior art travel cases.

5. Shock absorbers, rotational mounts and guy cables capable of protecting the bicycle from the case being both dropped, thrown and tipped over.

These and other benefits of one or more aspects will become apparent from a consideration of the ensuing description and accompanying drawings.

Figure 1:
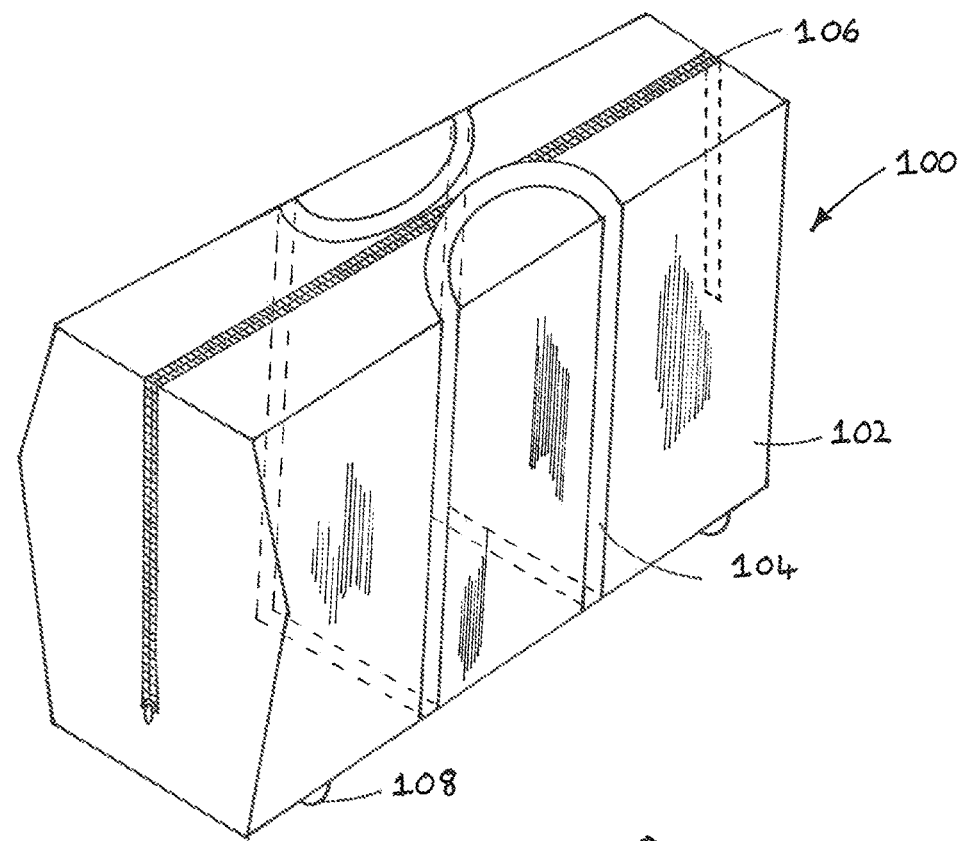
FIG. 1 is a perspective view of a bicycle transport case with a cover fully closed.

FIG. 1 is a perspective view of a travel case for a bicycle, designated as bicycle travel case 100. A fabric cover 102 is fastened and enclosing it fully. The cover 102 is formed from an abrasion and tear resistant fabric, with a zipper 106 traversing around a plurality of planes of the cover 102. A second embodiment has a cover made of a stiff material, or a combination of fabric and stiff material. A plurality of carrying handles 104 enable carrying and moving of the case 100, in conjunction with bicycle case wheels 108 for mobility.

Figure 2:
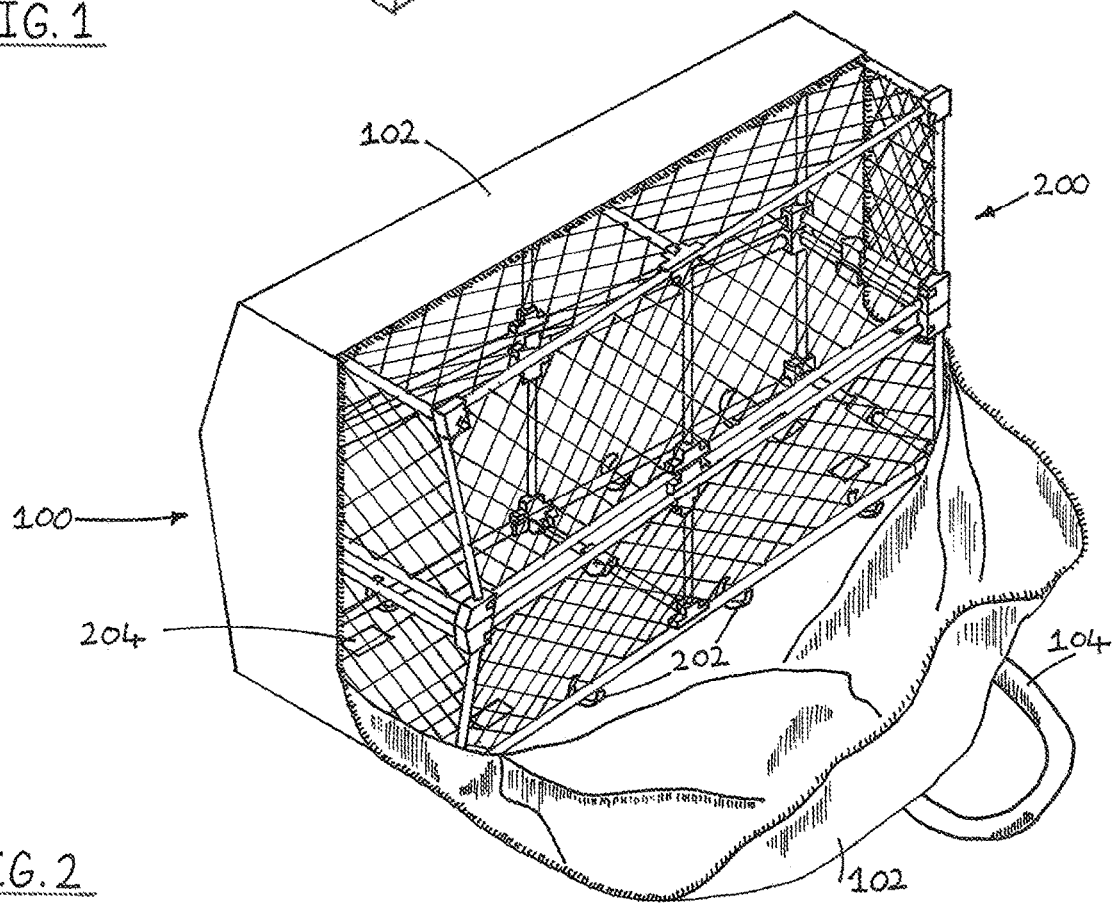
FIG. 2 is a perspective view of the bicycle transport case with the cover partially opened. (Bicycle and mounting rails omitted for clarity of case interior).

FIG. 2 shows the bicycle travel case 100 with the fabric cover 102 unzipped. Hook and loop tabs 202 elevate the cover 102 off the ground by securing it to an inner frame 200. To accommodate wheels 108 with cover 102 in place, a wheel cutout 204 is provided through cover 102 for each wheel 108.

Figure 3:
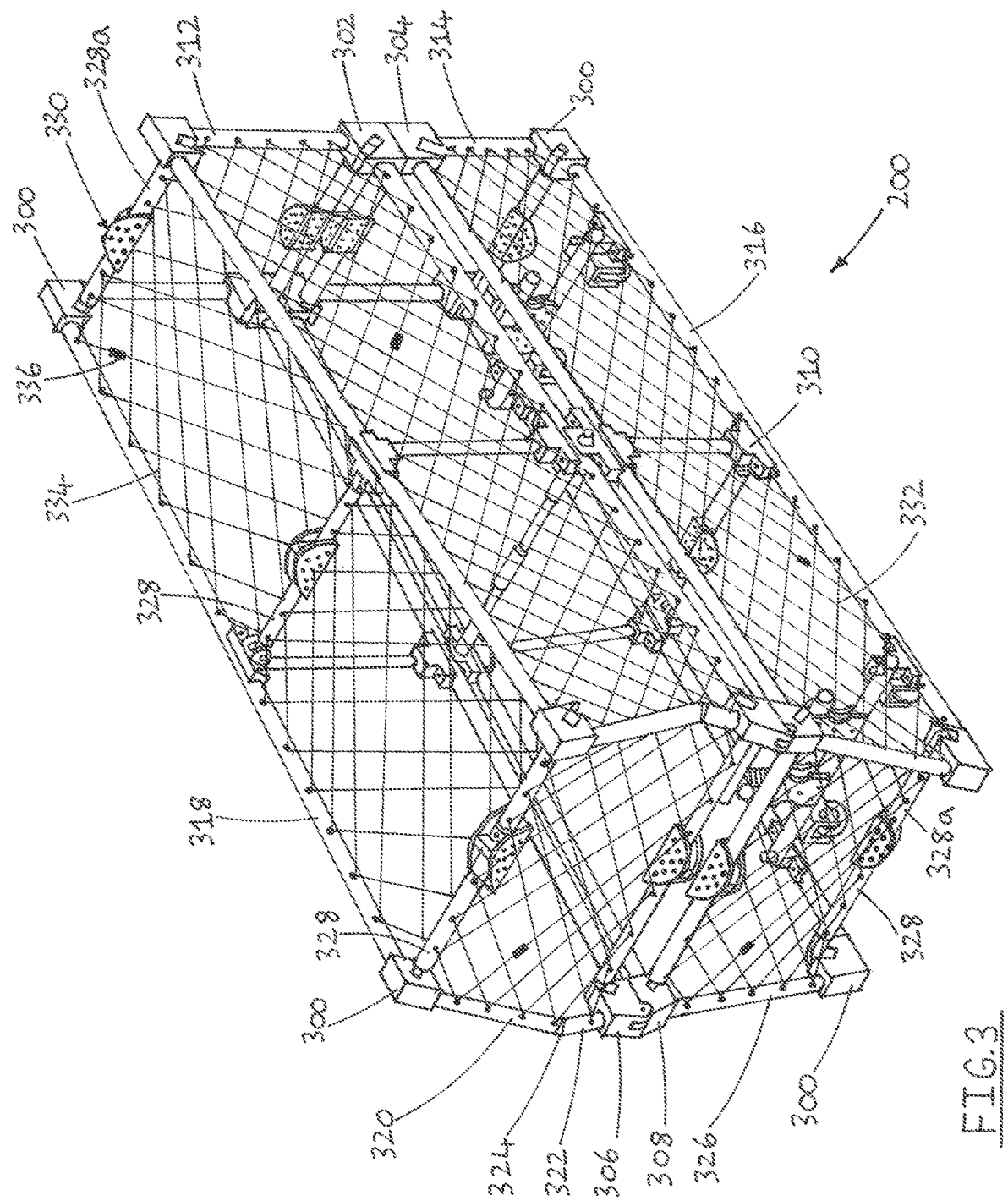
FIG. 3 is a perspective view of an interior frame of the bicycle transport case. Mesh panels are only shown on the nearest faces to the viewer to aid in drawing clarity. (Cover and bicycle removed).

FIG. 3 shows the inner frame 200 with the cover 102 removed. Inner frame 200 has a lower horizontal rail 316 that joins into a corner block 300 at both its ends. From one corner block 300, a lower back rail 314 rises substantially vertically. At the opposing end of rail 316, a lower front rail 326 rises from corner block 300. Rail 326 is connected into a lower hinge block 308 and rail 314 is connected into a lower latch block 304.

Block 304 is contiguously positioned beneath an upper latch block 302. An upper back rail 312 rises substantially vertically from block 302.

Block 308 is connected in a hinged manner to an upper hinge block 306. A pitch change tube 322 is fitted into block 306. The opposing end of tube 322 is fastened to a pitch change connector 324. Connector 324 links into an upper front rail 320. Rail 320 terminates in corner block 300. A top rail 318 spans between corner blocks 300 that join to rail 320 and rail 312. A pair of these substantially rectangular tubular arrangements thus formed is positioned substantially vertical, then linked horizontally by a multitude of cross strut tubes 328 and secondary cross strut tubes 328a. A cross strut hinge 330 connects tube 328 and tube 328a together.

Round tubing in a suitable lightweight material, such as Aluminum, is used in this embodiment for the inner frame 200 to offer the highest strength to weight ratio, but other profiles and materials are compatible.

The straight sided nature of the case 200 in this embodiment offers ease of construction, however it can have other shapes involving curved or sloping sided shapes, and other straight sided shapes that are not substantially rectangular.

Figure 4:
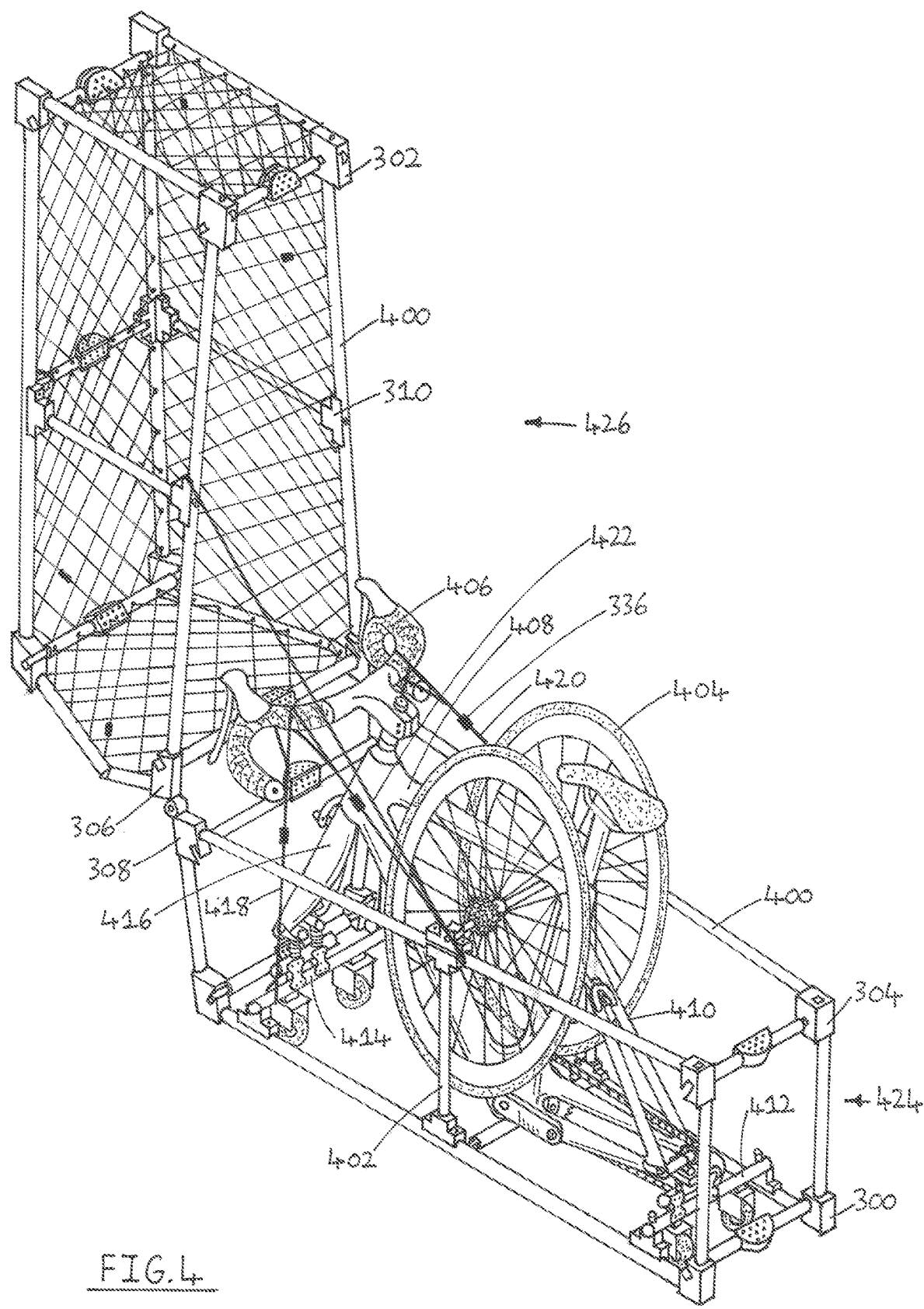
FIG. 4 is a perspective view of the bicycle transport case with a bicycle installed and an upper section shown in the open position (fabric cover removed). Mesh panels are removed completely on the bottom section to illustrate bicycle mounting clearly. Mesh panels on the near side of the upper section were removed for drawing clarity.

FIG. 4 shows inner frame 200 with a bicycle frame 408 and bicycle wheels 404 installed inside. Bicycle frame 408 has a front fork 416 and a rear fork 410. A front fork mount cross rail 414 and a rear fork mount cross rail 412 span between rails 316. The connection of the bicycle forks 416 and 410 to these will be discussed in relation to later drawings.

Between block 308 and block 304 extends a middle rail 400 that is substantially horizontal. Another rail 400 extends between blocks 306 and 302. A rectangular shape is thus defined between bottom rail 316 and middle rail 400 (referring to FIG. 3), with rail 314 and rail 326 defining the vertical sides. A second rectangular shape is formed between middle rail 400, and top rail 318, with rail 312 defining one vertical side, and rail 320 and tube 322, linked via connector 324 forming the second vertical side.

In each of the four rectangular shapes thus formed, a gridwork of side mesh panels 332 is individually installed. This embodiment uses a 45-degree diagonal pattern. Material choice for this embodiment is Kevlar cord, which exhibits great strength to weight ratio, abrasion and chemical resistance, combined with negligible stretch properties over time. Alternative embodiments utilize non-Kevlar cord, or metal cable, and can be oriented in a non-diagonal pattern.

Figure 8:
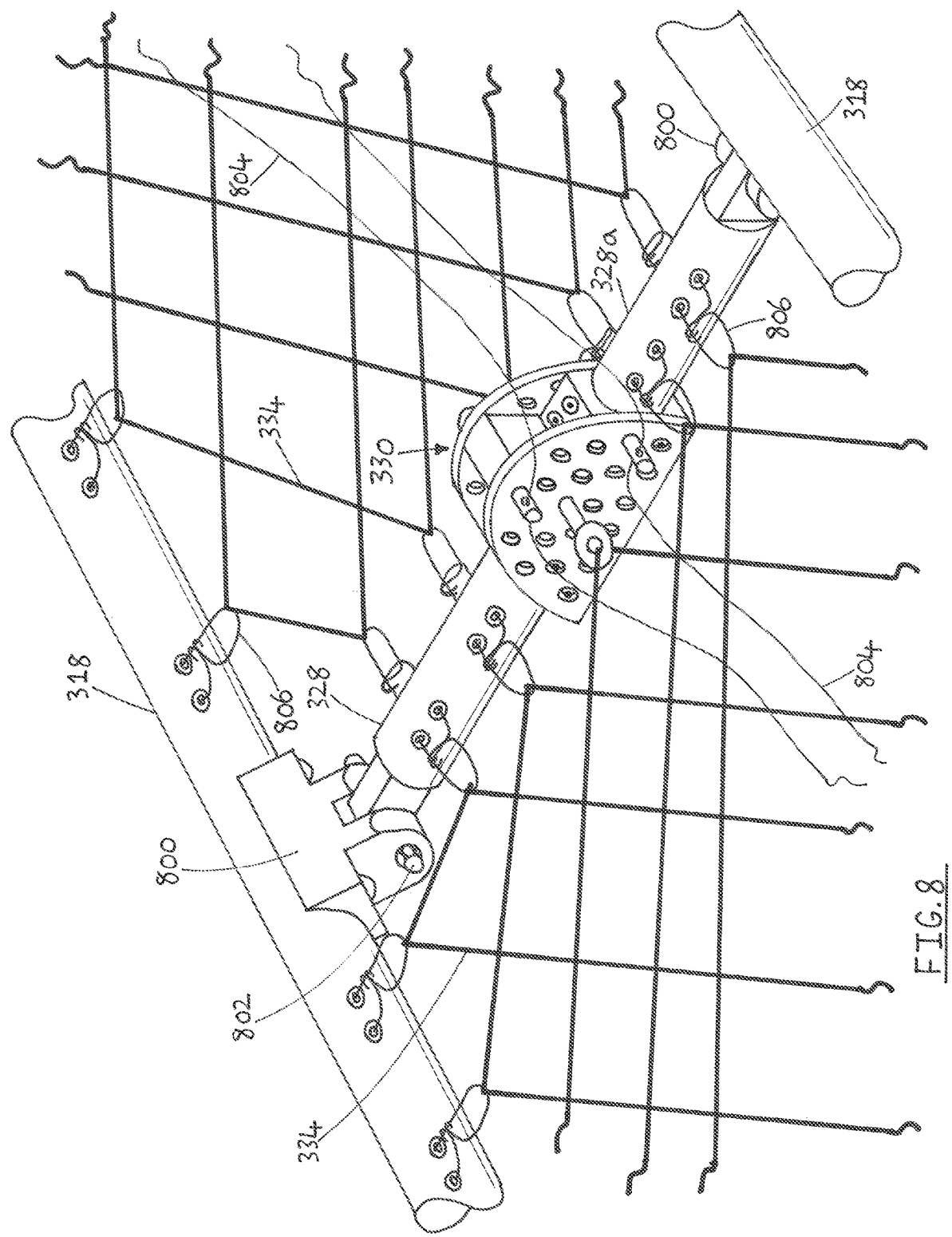
FIG. 8 is a view in detail of a cross strut and perimeter mesh.

A tension adjuster 336 forms the Kevlar cord in each panel of side mesh 332 into a continuous loop. In this embodiment, a CRIPPLER is used for adjuster 336. Any suitable tensioning ratchet, lever or knot may be substituted. A total of four individual side mesh panels 332 is installed in inner frame 200. This embodiment uses a mesh panel 332 formed with five vertical mesh tether points 806 and sixteen horizontal tether points 806. FIG. 8 shows an enlarged view including mesh tether point 806.

Referring to FIG. 3, a perimeter mesh panel 334 is installed in the shape defined between cross strut 328 and 328a assemblies and the perpendicular rails. A total of eight perimeter mesh panels 334 is used in this embodiment, with panel 334 having a gridwork of five tether points 806 on one axis, and six tether points 806 on the perpendicular axis. Mesh panel 334 is also formed from a Kevlar cord joined at its ends by tension adjuster 336 into a continuous loop. FIG. 8 shows an enlarged view of this arrangement. Other embodiments include mesh panels in any other number of attachment points, and combinations of individual lines not formed into a continuous loop.

Note that in FIG. 3, side mesh 332 is only shown on the side closest to the viewer, and perimeter mesh 334 is shown omitted between lower rails 310, back rails 312, and back rails 314 to increase the clarity of the remaining mesh panels 332 and 334 shown. FIG. 4 also illustrates how a lower section 424, and an upper section 426 is produced with the hinged connection between blocks 306 and 308. Perimeter mesh 334 and side mesh 332 is completely omitted from the lower section 424 and partially omitted from upper section 426 in FIG. 4 to aid in illustrating how bicycle frame 408 is installed in inner frame 200.

Connected to the bicycle frame 408 is a handlebar 406. The inner frame 200 is widest at the location of the handlebars 406. Both upper section 426, and lower section 424, taper narrower towards the rear fork 410 end. The lower section 424 is also narrower at the cross rail 414 compared to the width of upper section 426 at the handlebar 406 end.

This embodiment offers the smallest sized case that will surround forward facing handlebars, but other relative orientations are available. A second embodiment is designed to accommodate handlebars 406 rotated at any angle between facing forwards and completely sideways. A third embodiment accommodates a bicycle with detached handlebars.

A handlebar vertical tether 418 is used to secure handlebar 406 to cross rail 414, with adjuster 336 providing varying lengths for tether 418. A handlebar horizontal tether 420 in conjunction with adjuster 336, secures handlebar 406 to a suitable location, such as connector 310. Alternatively, tethers 418 and 420 and may be mounted to other suitable locations.

An upper section tether line 422 is fastened to connector 310 on both section 424 and section 426, holding upper section 426 open at several degrees more than a 90-degree angle to lower section 424. Alternatively, a hinged rigid strut can be used, or another embodiment could allow upper section 426 to open anywhere between 90 and 180 degrees relative to lower section 424, with attachment points at other locations than connector 310.

Referring to FIG. 3, a plurality of cross strut tubes 328 and 328a, incorporating hinge 330 are provided around the perimeter of the case. A further embodiment has cross strut tubes without hinges, while another embodiment has telescopic cross strut tubes.

Crush struts 402 are shown in FIG. 4 and are included in a plurality of locations to increase the resistance of the inner frame 200 to vertical and horizontal loads. Crush strut connector 310 offers one embodiment to secure struts 402 in place.

Figure 5:
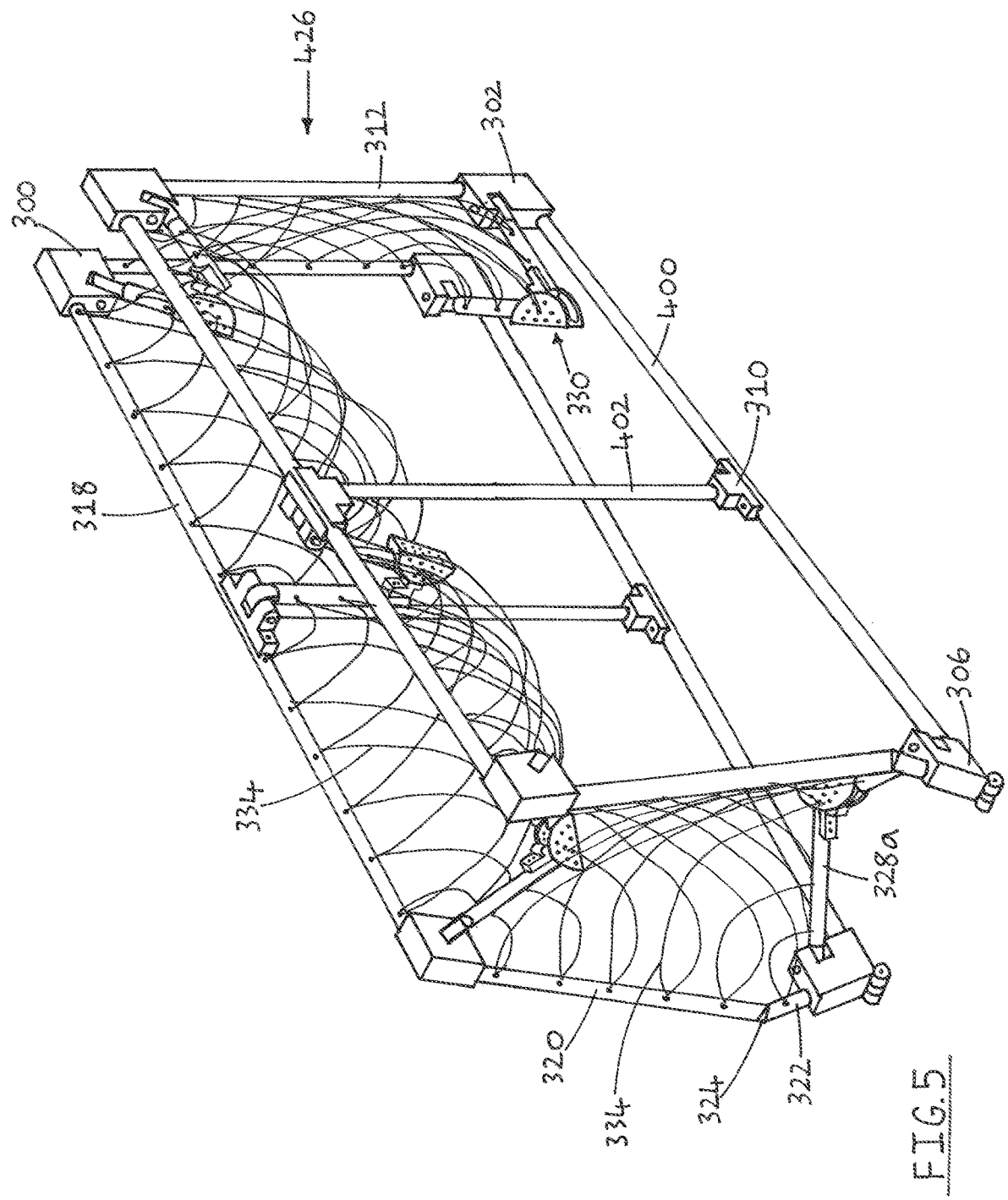
FIG. 5 is a view in detail of an upper section (shown removed from lower case section). Side panel mesh is omitted to clearly illustrate how perimeter mesh panels fold for storage.

FIG. 5 is a perspective view of upper section 426 detached from lower section 424. In this arrangement, cross strut 328a is shown with hinge 330 in a partially folded position, Perimeter mesh 334 transforms from the tensioned mesh arrangement shown in FIG. 3 to the loose arrangement in FIG. 5. Section 426 and 424 can be folded to the capacity of hinge 330.

Side mesh panels 332 are shown removed in FIG. 5 to illustrate this feature clearly.

Figure 6:
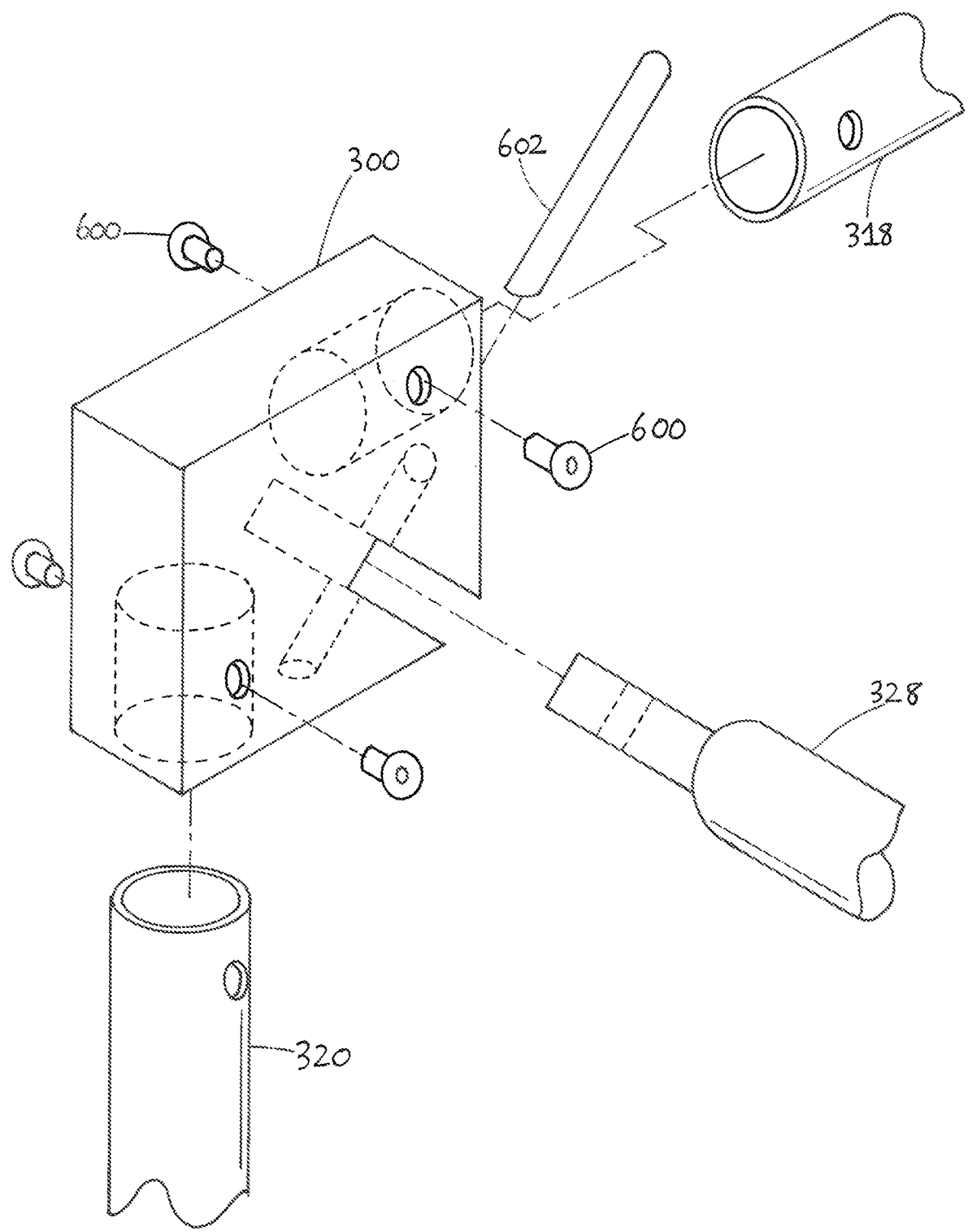
FIG. 6 is an exploded view of a corner connector.

FIG. 6 is an exploded view of a corner block 300. A rivet 600 is used in multiple locations to secure rails 318 and 320 in place. A singular rivet 600 may be used, or alternative mechanical fasteners used in a further embodiment. A further embodiment could utilize heat joining methods such as welding or brazing.

Figure 9:
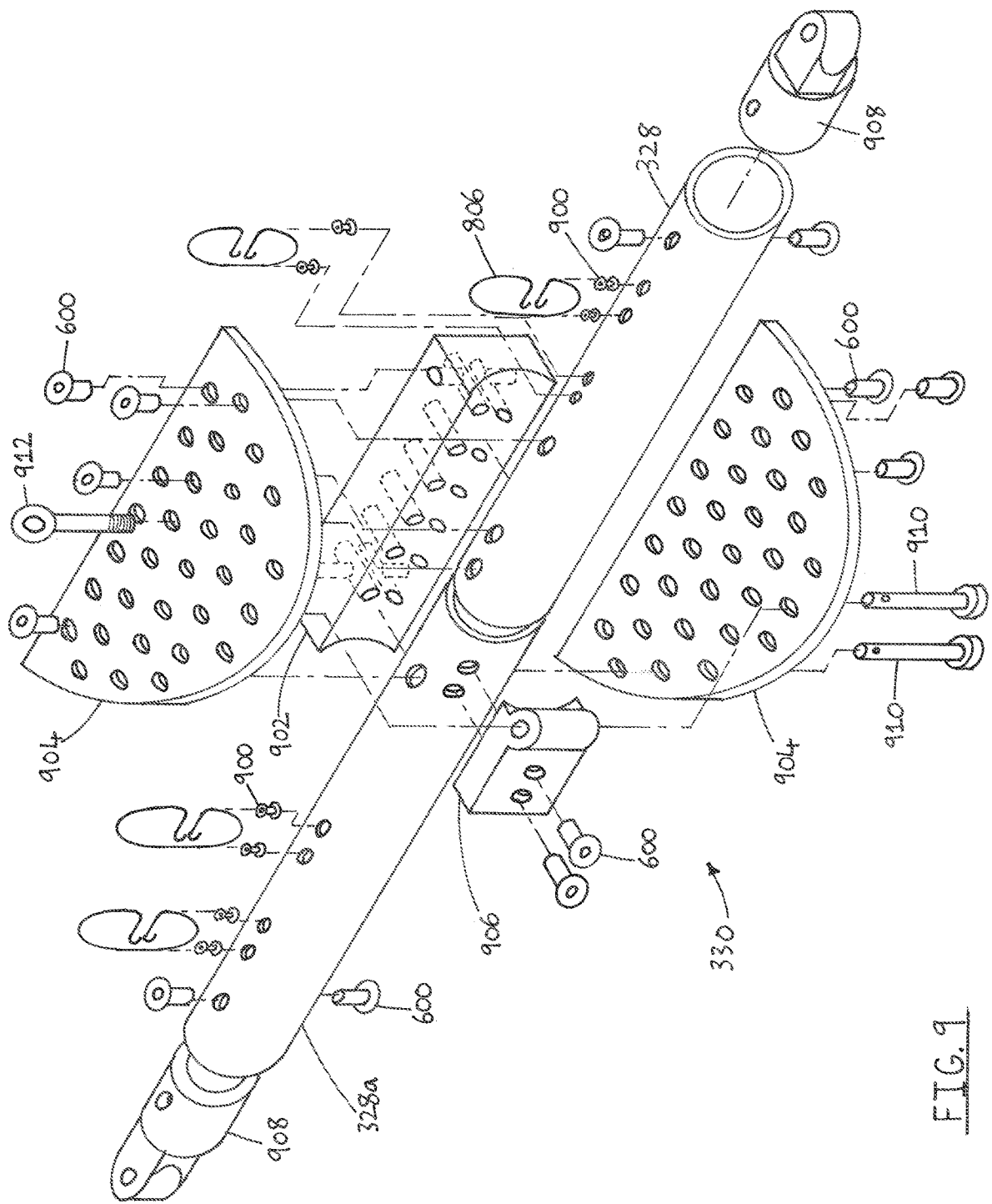
FIG. 9 is an exploded view of the cross strut in FIG. 8.
Figure 10:
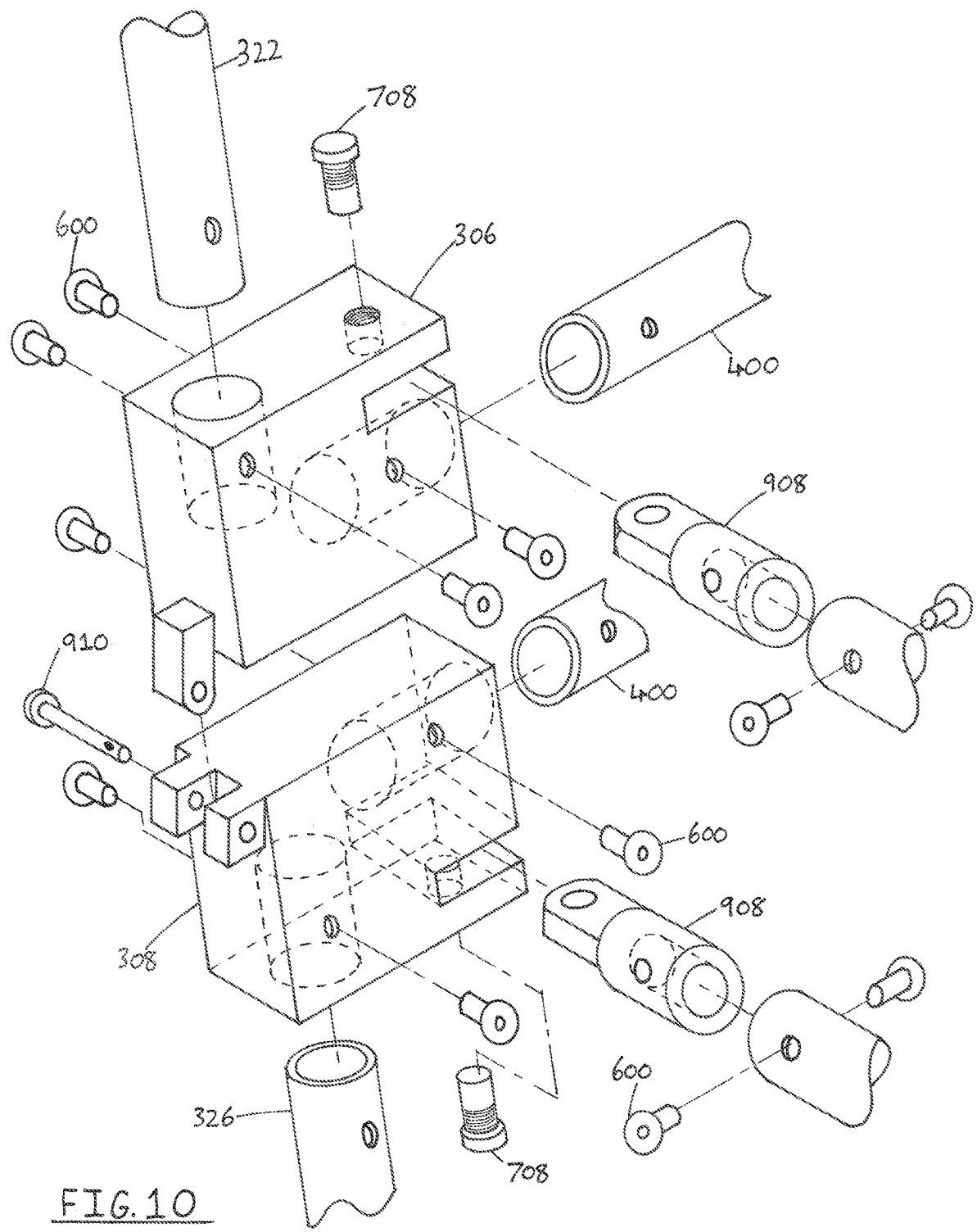
FIG. 10 is an exploded view of a front hinge, linking upper and lower sections.

Block 300 may be constructed of any suitable material and shape, substantially square was chosen for this embodiment for simplicity of construction. A corner hinge pin 602 is used to secure strut 328 in a hinged manner. A detailed view of strut 328 connections is shown in FIGS. 8, 9 and 10.

Figure 7:
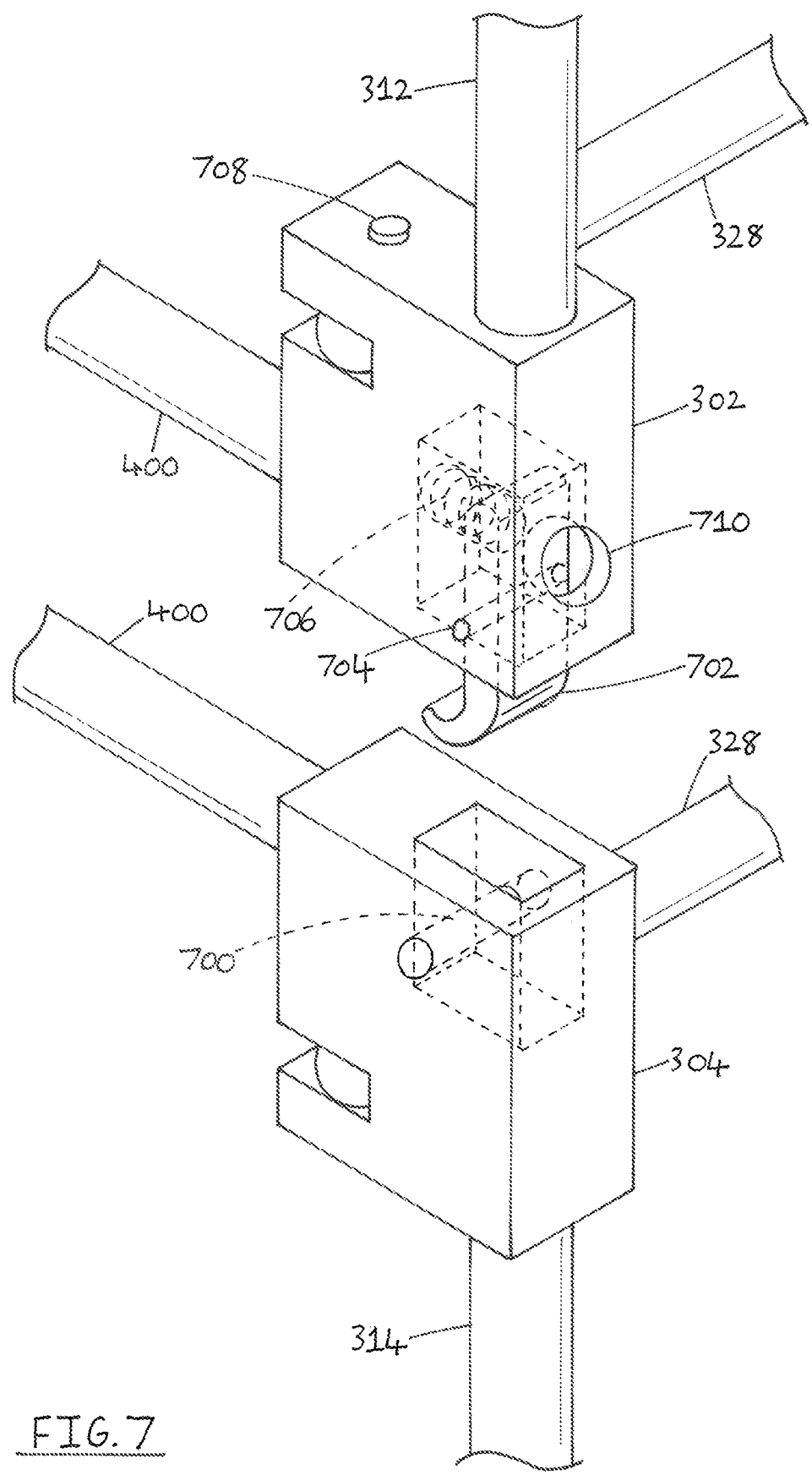
FIG. 7 is a perspective view of a rear latch, shown in the partially open position.

FIG. 7 is a perspective view of a latch block 302 and a latch block 304 in a partially opened position.

A latch 702 rotates on a latch pivot 704, A latch spring 706 is utilized to retain latch 702 around a latching bar 700. A latch access hole 710 allows spring 706 to be compressed by pushing on latch 702, thereby releasing 702 from bar 700.

FIG. 8 is a detailed perspective view of the interaction of perimeter mesh 334 with struts 328, 328a and top rails 318. A mesh tether point 806 allows mesh 334 to slide easily as sections 424 and 426 are folded or unfolded as per FIG. 5. In this embodiment, side mesh 332 is also installed with tether points 806 to facilitate tensioning with adjuster 336.

A cross strut saddle connector 800 provides a hinged connection point for struts 328 and 328a. In this embodiment it is installed tilted vertically downward to prevent hinge 330 from sticking above rails 318, thereby offering impact protection to hinge 330. Two separate sections of perimeter mesh 334 are shown in FIG. 8, each terminating at adjacent sides of struts 328 and 328a.

FIG. 9 is an exploded view of how cross strut tubes 328, 328a and strut hinge 330 are assembled. A cross strut knuckle 908 is shown riveted into one end of tube 328, with another knuckle 908 riveted into one end of tube 328a. In FIG. 8 knuckle 908 is hinged to saddle connector 800 using a saddle connector hinge pin 802.

Knuckle 908 also allows strut 328 to be connected to block 300 in a hinged manner, pivoting about hinge pin 602 (see FIG. 6). Knuckle 908 also links struts 328 and 328a to blocks 304 and 302 (see FIG. 7), pivoting on a cross strut knuckle hinge pin 708.

Referring to FIG. 9. mesh tether point 806 is paired with a grommet 900 to protect it from abrasion. This embodiment uses a high strength metal clip for 806, but other attachment methods may be used. To maintain even spacing of perimeter mesh 334, a threaded tether eyelet 912 is used in the middle of a cross strut hinge faceplate 904 where tether point 806 is incompatible.

Hinge 330 from FIGS. 3, 5 and 8 is formed from a combination of parts. On FIG. 9, these are a pair of cross strut hinge faceplates 904, a cross strut hinge block 902, a cross strut hinge pivot block 906 and a pair of safety chain pins 910. One pin 910 forms a hinge point for block 906 to pivot around, passing through faceplates 904, and a second pin 910 passes through faceplates 904 and strut 328a, locking it in the open position shown in FIG. 8.

Strut 328 is fixedly connected to plates 904 with rivets 600. Strut 328a has block 906 fastened to it with a plurality of rivets 600. Thus, strut 328a is pivotable while strut 328 is static.

Hinge 330 is shown in the locked open position in FIG. 8, with a safety chain 804 passing through pins 910. Chain 804 is stainless steel cable in this embodiment for abrasion resistance.

A length of chain 804 is used to lock hinges 330 for lower section 424, and a separate length of chain 804 is used to lock hinges 330 for upper section 426. An adjuster 336 is used to form each chain 804 into a continuous loop preventing unauthorized disassembly. Further embodiments include strut hinges 330 with pivot block 906 mounted on a non-removable hinge pin, no safety chain employed, or alternative locking devices that do not require a separate safety chain.

Faceplate 904 and hinge block 902 have holes for installation of rivets 600, and additional holes to save weight in this embodiment. Further embodiments include 902 and 904 without weight saving holes, and a one-piece assembly that combines hinge block 902 and faceplates 904. Another embodiment has an internal, inline hinge inside strut tube 328 and 328a as opposed to the external type used in this embodiment.

FIG. 10 is an exploded view of upper hinge block 306 and lower hinge block 308. A chain pin 910 forms a removable hinged connection between blocks 306 and 308. Safety chain 804 used for upper section 426 also locks this pin 910 in place.

A plurality of rivets is used to secure rails 322 and 400 to block 306, and rails 326 and 400 to block 308. Further embodiments include other mechanical fastening methods or heat applied methods.

Figure 11:
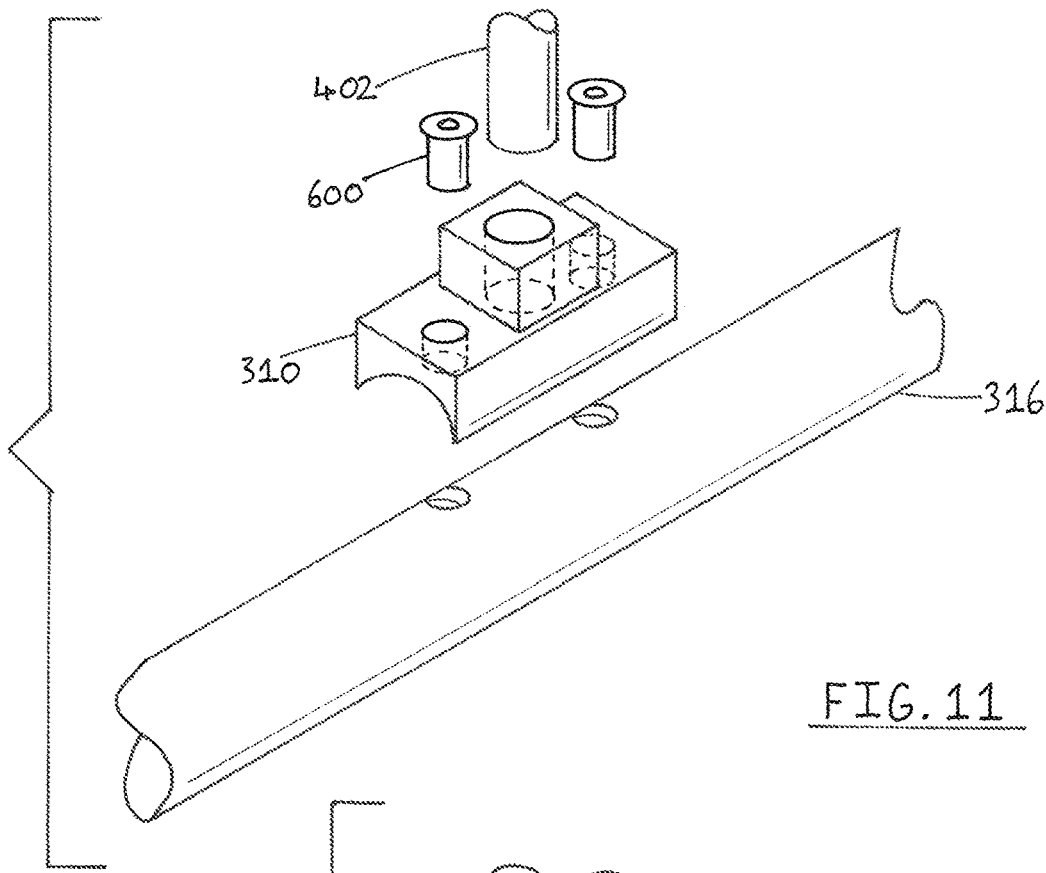
FIG. 11 is an exploded view of a crush strut connector block.

Knuckle hinge pin 908 is pivotally connected to block 306 or 308 using hinge pin 708. Blocks 306 and 308 may alternatively be produced in a similar format as corner block 300 of FIG. 6, which hinges cross strut knuckle 908 in an angled arrangement to block 300, rather than the parallel arrangement of knuckle 908 to blocks 306 and 308 of FIG. 10, FIG. 11 is an exploded view of crush strut connector 310 interfacing with rail 316, using rivets 600 for mechanical connection. Connector 310 is fastened identically to FIG. 11, regardless of which rail it is connected to.

Crush strut 402 is solid aluminum rod in this embodiment, further embodiments include tubing or different profiles or materials.

Figure 12:
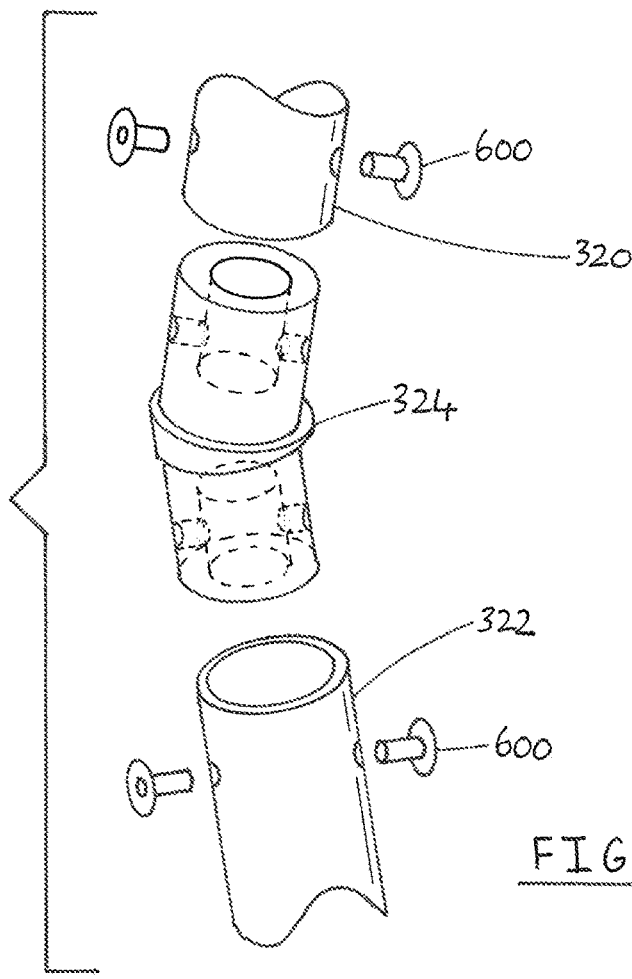
FIG. 12 is an exploded view of a pitch change connector.

FIG. 12 is an exploded drawing detailing connector 324 interfacing with rail 320 and tube 322. This embodiment is solid aluminum, machined to fit inside the internal diameter of rail 320. The purpose of connector 324 is to provide the smallest size inner frame 200 while still accommodating handlebar 406. Further embodiments have connector 324 in different locations than that shown in FIG. 3, and potentially multiple sets of connectors 324. Alternative embodiments include an external connector, or one single bent rail that combines front rail 320, pitch change connector 324 and tube 322 into one piece.

Figure 13:
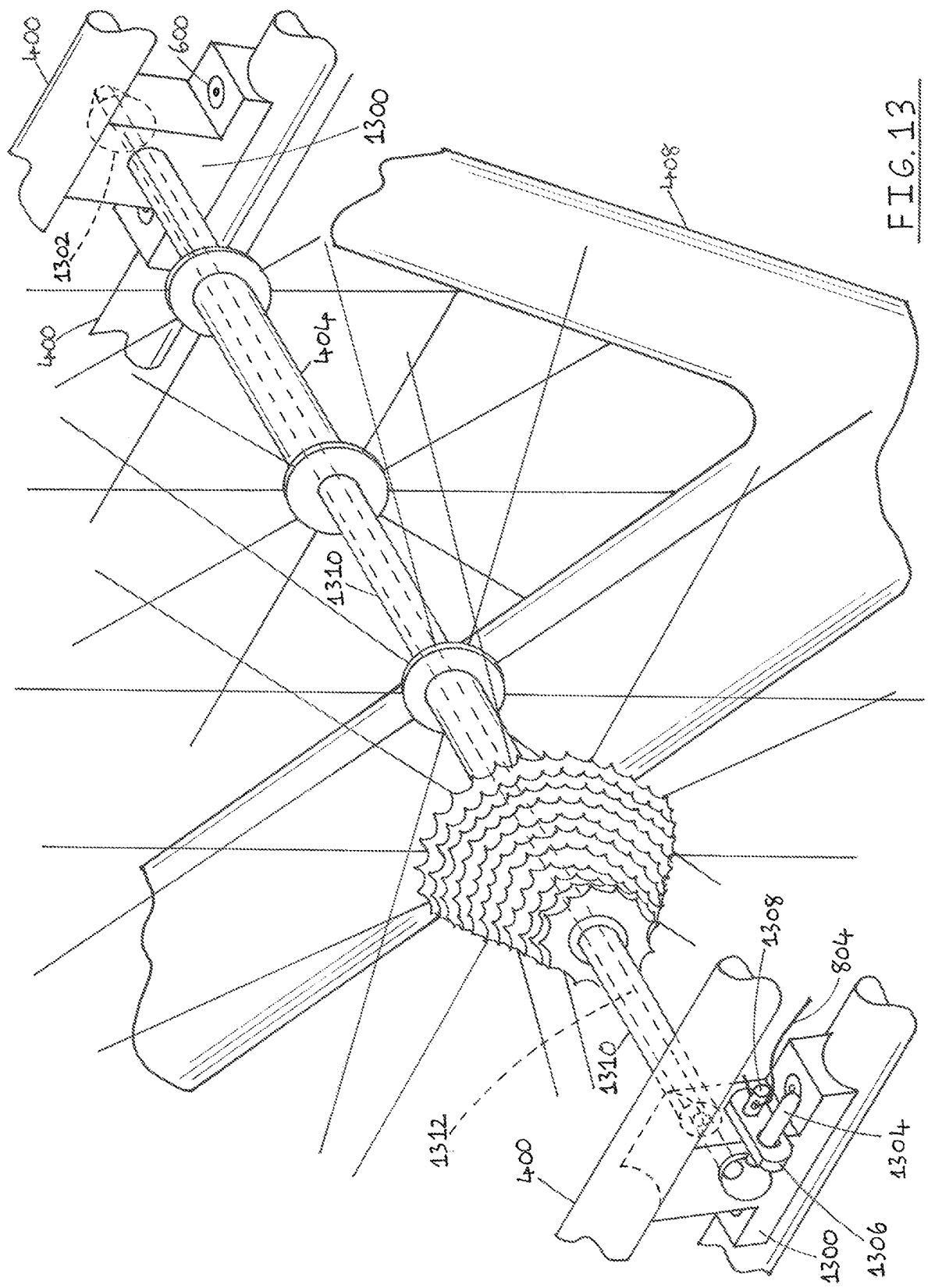
FIG. 13 is a detailed view of a bicycle wheel mounting device.

As can be seen in FIG. 4, bicycle wheels 404 are positioned either side of bicycle frame 408. A detailed view of this arrangement is shown in FIG. 13, A pair of wheel mounting skewer blocks 1300 are riveted into rails 400. In this embodiment these are positioned in line with blocks 310 (see FIG. 3). A skewer rod 1312 extends between blocks 1300. A skewer nut 1302 is threaded onto one end, the opposite end having a skewer handle 1304. In the spaces between the bicycle wheels 404, and between wheels 404 and blocks 1300, a spacer sleeve 1310 is installed over rod 1312. Thus, when handle 1304 is closed, a rigid arrangement is formed. With handle 1304 in the closed position, a skewer locking plate 1306 is slid over a mounting post 1308. Plate 1306 encircles skewer handle 1304, and with safety chain 804 installed through post 1308 unauthorized removal is prevented.

Safety chain 804 for lower section 424 is used for this purpose. Using chain 804 from upper section 426 prevents 426 from being able to open fully.

Further embodiments include an inner frame 200 designed to not carry bicycle wheels 404, and a frame 200 with independent mounting arrangements for one or more bicycle wheels 404 installed in different locations to this embodiment.

Figure 14:
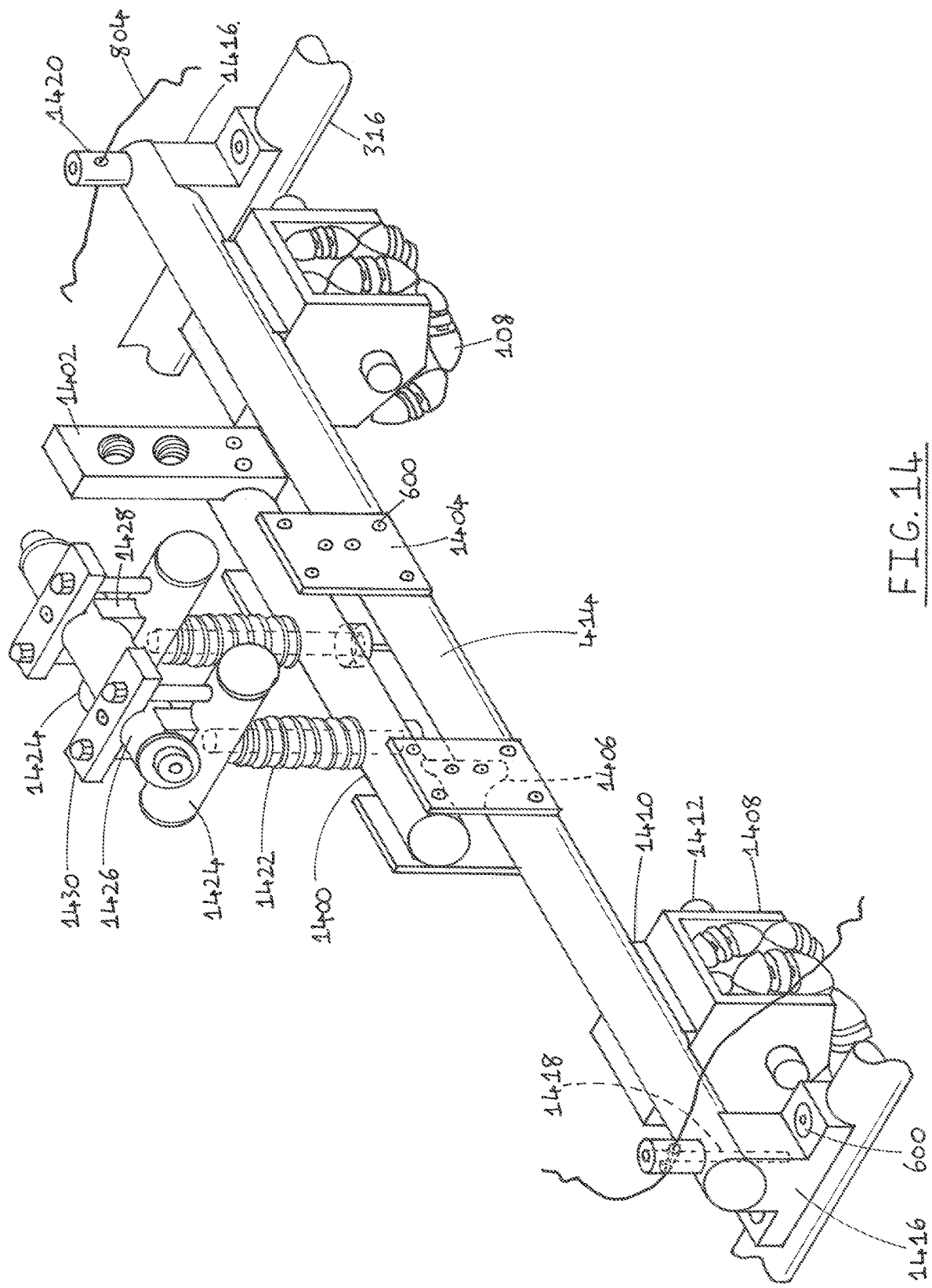
FIG. 14 is a view in detail of a front fork mounting device. (Anti tamper standoff not installed, and perimeter mesh shown removed for clarity).
Figure 15:
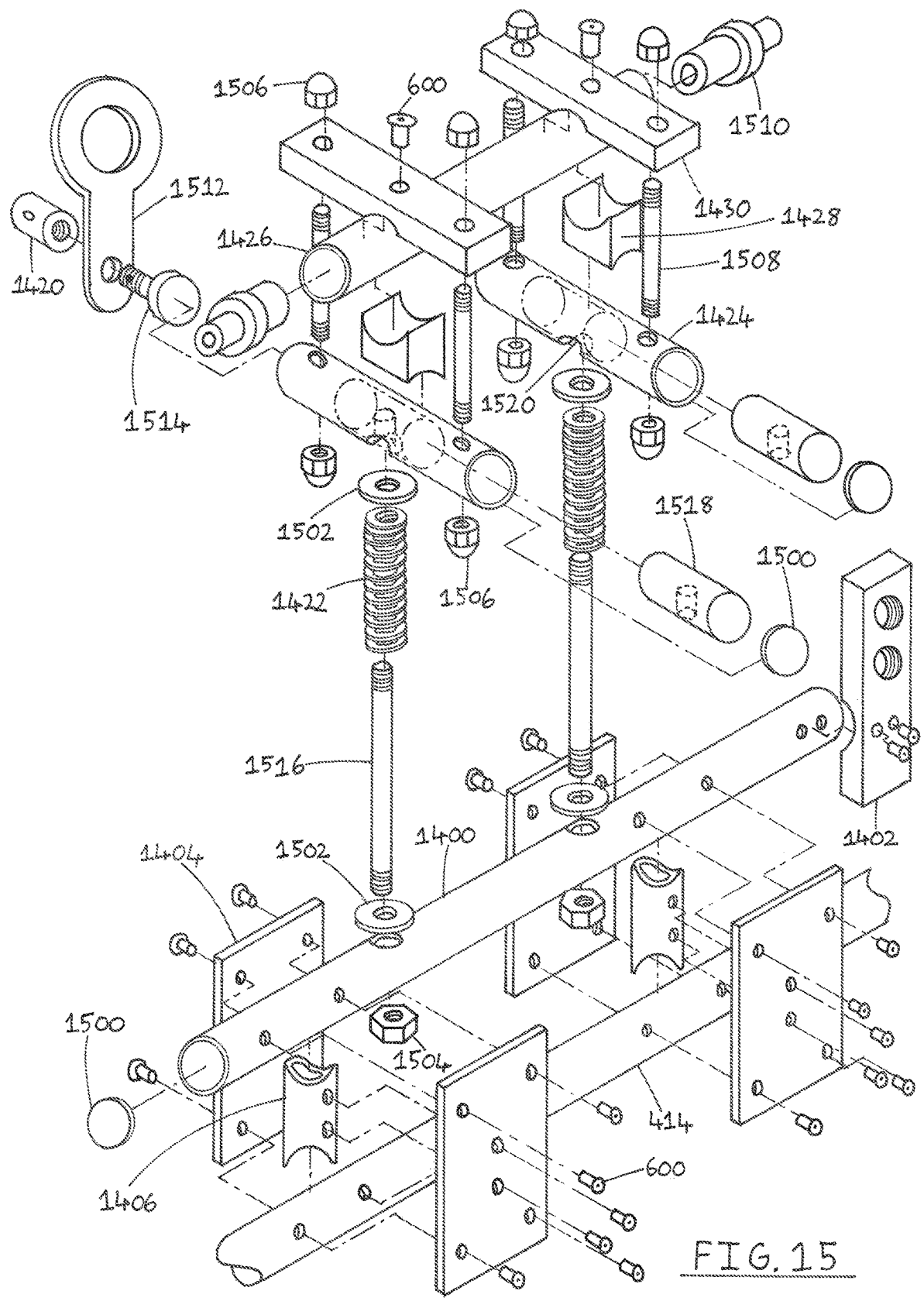
FIG. 15 is an exploded view of the fork mounting device of FIG. 14.

A front fork mounting arrangement is illustrated in FIG. 14 and shown in exploded form in FIG. 15. Cross rail 414 that was first introduced in FIG. 4, spans between a pair of lower rails, 316. A cross rail saddle block 1416 is fastened with rivets 600 to rail 316. A threaded stud 1418 is fastened into block 1416 with enough length projecting to pass through rail 414 and have a threaded safety sleeve 1420 installed onto it. Safety chain 804 used for lower section 424 passes through 1420 and 1418, preventing rail 414 being removed or tampered with.

For mobility of case 100, four bicycle case wheels 108 are installed. This embodiment uses a multidirectional skate wheel such as that made by ROTACASTER™, This allows case 100 to be fully maneuverable without the use of traditional swiveling caster wheels which could damage perimeter mesh 334. Wheel 108 is mounted to a wheel shroud 1408 by a wheel axle 1412. A wheel shroud saddle block 1410 is positioned between shroud 1408 and rail 414. Rivets 600 secure shroud 1408 to rail 414, with saddle block 1410 providing a stable mounting platform.

Shroud 1408 is located along rail 414 to allow it to pass through the gridwork of perimeter mesh 334. Block 1416 is positioned along rail 316 to facilitate this. Note, perimeter mesh 334 is omitted from FIG. 14 to assist in numbering of components. It is shown in FIG. 3.

Alternative embodiments use other types of wheels in any number to make the case 100 mobile. A further embodiment has wheels that are spring loaded to retract if case 100 is dropped, and another embodiment has wheels that retract if hit in any direction, then return to their original position.

A front fork shock rail 1400 is spaced off rail 414 by two vertical spacer tubes 1406 shown in the exploded view in FIG. 15. Four rivet plates 1404 and a plurality of rivets are used to join components 414, 1406 and 1400 together. A pedal mount 1402 is also fastened to rail 1400 but may be omitted or relocated.

Figure 18:
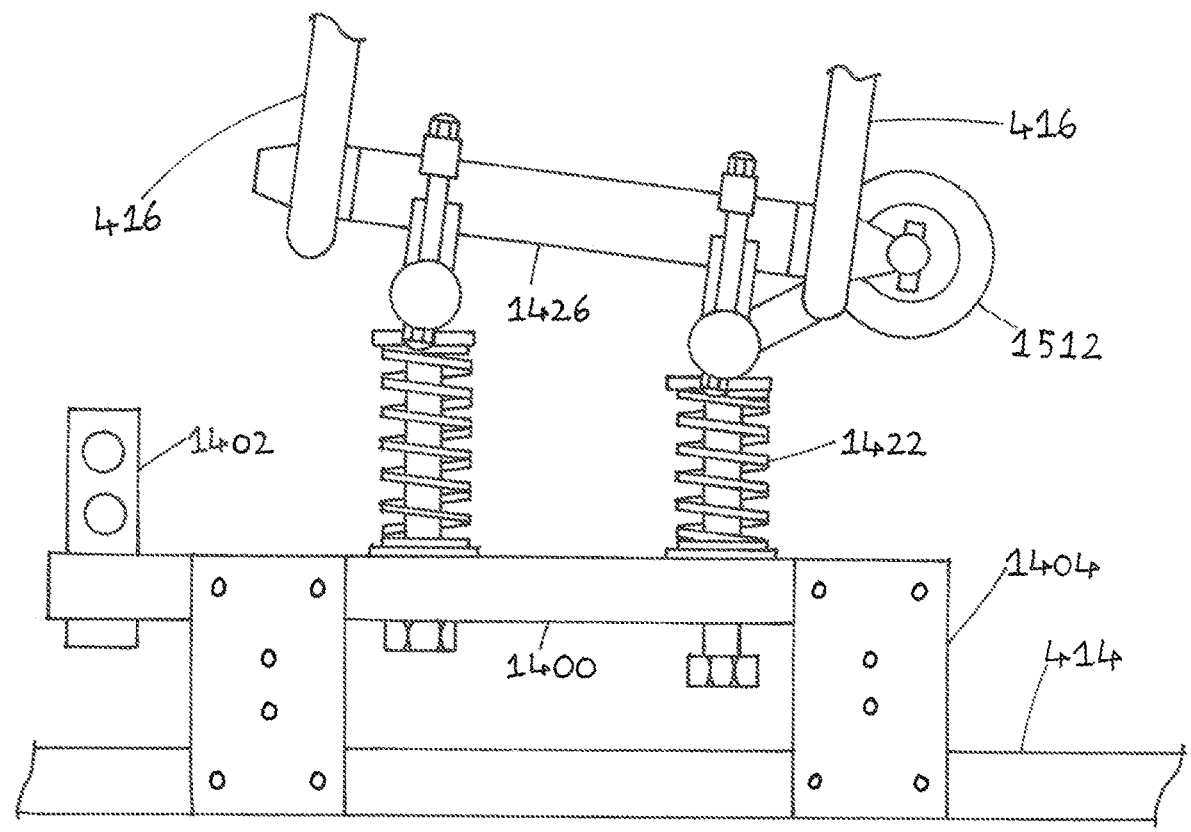
FIG. 18 is a view of the front fork mount of FIG. 14 illustrating the shock absorption feature in operation.

To mount the front bicycle fork 416 in place as shown in FIG. 18, it is located over an axle tube bushing 1510, shown in FIG. 15. Bushing 1510 can be made in different designs to accommodate all bicycle fork mount types and is installed into both ends of a front pivot tube 1426. A pivot tube saddle block 1428 is located beneath tube 1426 in two locations, as shown in FIG. 14 and FIG. 15.

In this embodiment shown in FIG. 15, block 1428 has curved profiles cut into it that allow tube 1426 to be arranged perpendicular to a pair of front pivot tubes, 1424. Parallel to each pivot tube 1424 is an axle tube securing block 1430. Each block 1430 is located above tube 1426 and is fastened to tube 1424 by an axle tube threaded linking rod 1508 in multiple locations. Both ends of rod 1508 are threaded into an acorn nut 1506.

Prior to inserting two rods 1508 through each tube 1424, a front pivot tube rotating rod 1518 is sized marginally less than the inner diameter of 1424 and is inserted as shown in FIG. 15. This forms a freely movable rotational connection between 1424 and 1518. A spring rod 1516 has its top end threaded into rod 1518, passing through an elliptical slot 1520 in the bottom of tube 1424. Washers 1502 and a spring 1422 are slid onto rod 1516. The bottom end of rod 1516 passes vertically through horizontal rail 1400 and is secured by a nut 1504.

The ends of tubes 1424 are fitted with a friction fit end cap 1500 in three locations. The remaining forth end of tube 1424 has a standoff mounting stud 1514 installed in it, by friction fit or threaded means. This provides a mounting point for an anti-tamper standoff 1512, which is secured by a threaded safety sleeve 1420 as per that used in conjunction with chain 804 to secure ends of rail 414 to threaded stud 1418 from FIG. 14.

Figure 16:
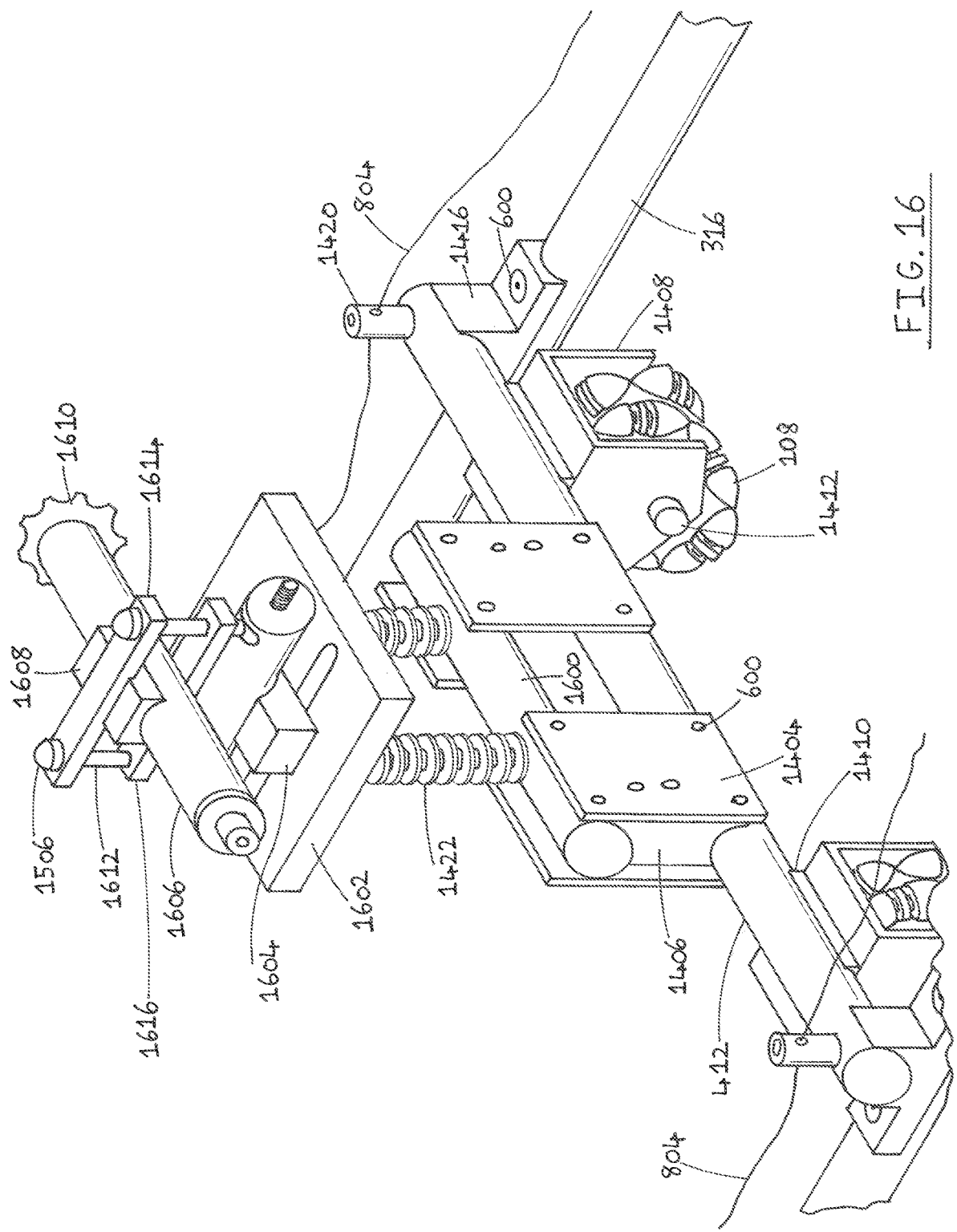
FIG. 16 is a view in detail of a rear fork mounting device.
Figure 17:
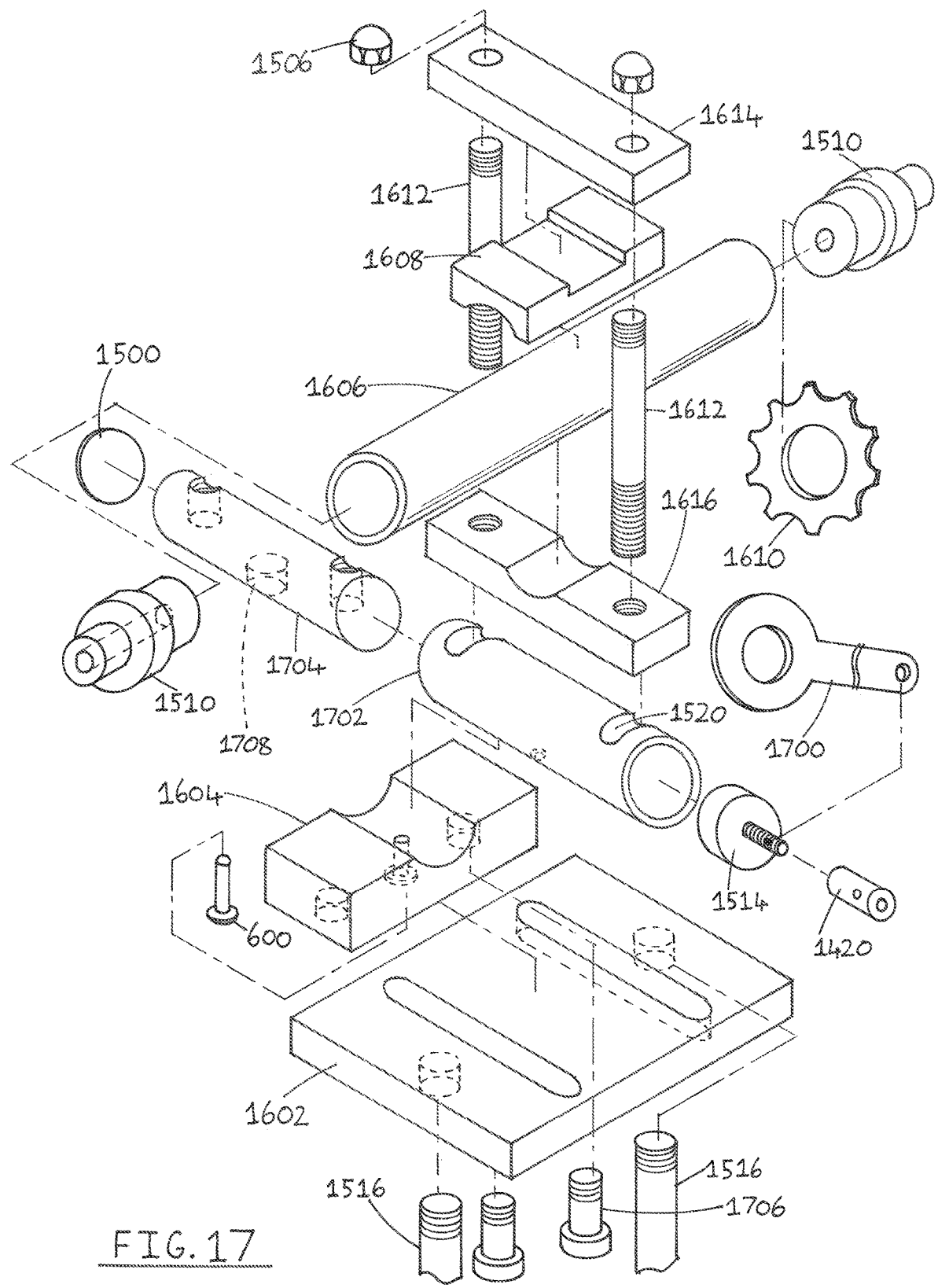
FIG. 17 is an exploded view of the rear fork mounting device of FIG. 16.
Figure 18B:
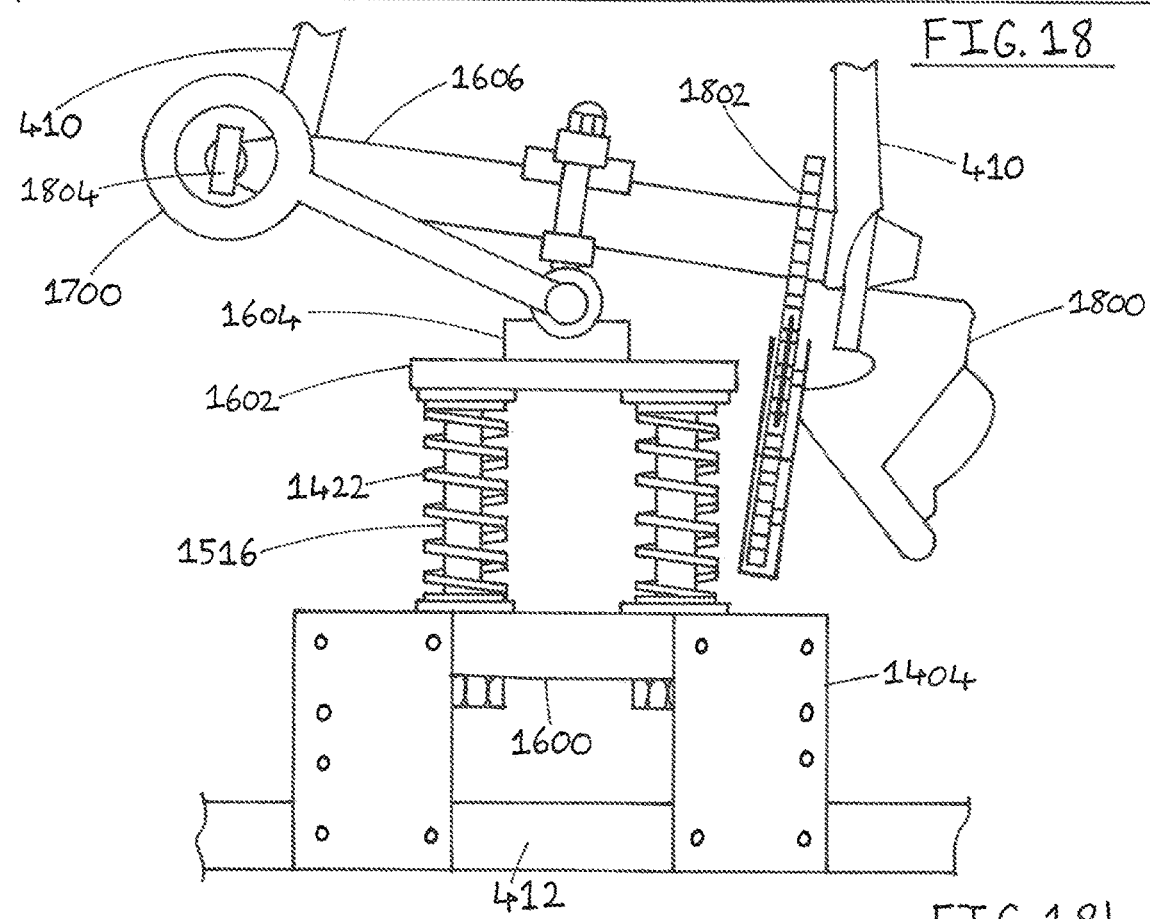
FIG. 18b Is a view of the rear fork mount of FIG. 16 illustrating the shock absorption feature in operation.

In FIG. 16 and FIG. 17, the method of mounting the rear bicycle fork 410 inside inner frame 200 is illustrated. In FIG. 18b, rear fork 410 is shown installed. In FIG. 17, the top end of spring rods 1516 is threaded into the underside of a base plate 1602. A positioning block 1604 is secured atop plate 1602 by a pair of machine screws 1706. Screws 1706 are tightened enough to hold block 1604 in place, but still allow it to slide as needed to accommodate different sizes of bicycle frame 408. Thread locking compound is used to prevent screws 1706 from becoming too loose.

A rear pivot tube 1702 is secured on top of block 1604 using rivet 600. A rear pivot tube rotating rod 1704 is sized marginally less than the inner diameter of tube 1702 and slid inside 1702 such that a pair of rear axle tube linking rods 1612 pass through elongated slots 1520 in tube 1702 into rod 1704. A rivet clearance hole 1708 allows rod 1704 to rotate freely inside 1702.

A rear axle tube bottom connector 616 has the bottom end of rods 1612 threaded through it and into 1704. For mounting a rear bicycle fork 410 in place, tube bushings 1510 of a suitable design are installed in both ends of a rear axle tube 1606. A dummy sprocket 1610 is installed on the bushing 1510 that is located on the side where a bicycle chain 1802 is positioned. FIG. 18b illustrates an example of this.

Returning to FIG. 17, tube 1606 is oriented perpendicular to pivot tube 1702. A rear axle tube saddle block 1608 is located on top of tube 1606 and interfaces with a rear axle top connector 1614 that spans between rods 1612. Rods 1612 freely slide through connector 1614 and acorn nuts 1506 are threaded on the top ends of rods 1612 to complete the assembly.

End cap 1500 is installed in one end of tube 1702, with mounting stud 1514 installed in the opposing end. An elongated anti tamper standoff 1700 is secured to 1514 by sleeve 1420.

LIST OF REFERENCE NUMERALS

100 Bicycle travel case
102 Fabric cover

104 Carrying handles
106 Zipper
108 Bicycle case wheels
200 Inner frame
202 Hook and loop tabs
204 Bicycle case wheel cutout
300 Corner block
302 Upper latch block
304 Lower latch block
306 Upper hinge block
308 Lower hinge block
310 Crush strut connector
312 Upper back rail
314 Lower back rail
316 Bottom rail
318 Top rail
320 Upper front rail
322 Pitch change tube
324 Pitch change connector
326 Lower front rail
328 Cross strut tube
328a Cross strut secondary tube
330 Cross strut hinge
332 Side mesh panel
334 Perimeter mesh panel
336 Tension adjuster
400 Middle rail
402 Crush strut
404 Bicycle wheel
406 Handlebar
408 Bicycle frame
410 Rear bicycle fork
412 Rear fork mount cross rail
414 Front fork mount cross rail
416 Front bicycle fork
418 Handlebar vertical tether
420 Handlebar horizontal tether
422 Upper section tether line
424 Lower section
426 Upper section
600 Rivet
602 Corner hinge pin
700 Latching bar
702 Latch
704 Latch pivot
706 Latch spring
708 Cross strut knuckle hinge pin
710 Latch access hole
800 Cross strut saddle connector
802 Saddle connector hinge pin
804 Safety chain
806 Mesh tether point
900 Grommet
902 Cross strut hinge block
904 Cross strut hinge faceplate
906 Cross strut hinge pivot block
908 Cross strut knuckle
910 Safety chain pin
912 Threaded tether eyelet
1300 Wheel mounting skewer block
1302 Skewer nut
1304 Skewer handle
1306 Skewer locking plate
1308 Mounting post
1310 Spacer sleeves
1312 Skewer rod
1400 Front fork shock rail
1402 Pedal mount
1404 Rivet plate
1406 Vertical spacer tube
1408 Wheel shroud
1410 Wheel shroud saddle block
1412 Wheel axle
1416 Cross rail saddle block
1418 Threaded stud
1420 Threaded safety sleeve
1422 Spring
1424 Front pivot tube
1426 Front axle tube
1428 Pivot tube saddle block
1430 Axle tube securing block
1500 End cap
1502 Washer
1504 Nut
1506 Acorn nut
1508 Axle tube threaded linking rod
1510 Axle tube bushing
1512 Anti tamper standoff
1514 Standoff mounting stud
1516 Spring rod
1518 Front pivot tube rotating rod
1520 Ellipse slot
1600 Rear fork shock rail
1602 Base plate
1604 Positioning block
1606 Rear axle tube
1608 Rear axle tube saddle block
1610 Dummy sprocket
1612 Rear axle tube linking rod
1614 Rear axle top connector
1616 Rear axle bottom connector
1700 Elongated anti tamper standoff
1702 Rear pivot tube
1704 Rear pivot tube rotating rod
1706 Machine screw
1708 Rivet clearance hole
1800 Bicycle derailleur
1802 Bicycle chain
1804 Bicycle fork skewer handle Operation Returning to FIG. 1 through 4, the operation of case 100 will be discussed.

With the case 100 fully assembled, the inner frame 200, with an upper section 426 and a lower section 424 separably joined about a horizontal axis near the middle of the case provides a rigid perimeter to encompass a minimally disassembled bicycle. This provides a much greater level of rigidity for impact and crush protection compared to a soft sided travel bag. Such a metal frame arrangement alone however, is inherently weak due to the lack of diagonal resistance to shear forces.

Simply applying a fabric cover 102 on top of this framework leaves very large areas of the case offering no protection to its contents, and the case would not be able to withstand diagonal forces during travel. There is a high likelihood of components that join tubing and struts together being broken which would render the case inoperable.

The diagonally woven and tensioned side mesh 332 and perimeter mesh 334 offers a reticulum gridwork serving multiple purposes. The vertical side mesh 332 is maintained under a state of tension. The perimeter mesh 334 is fully tensioned when the case is fully expanded. Thus, the folding cross struts 328 and 328a that divide the perimeter mesh 334 into panels, apply tension to the perimeter mesh 334 as they are unfolded into a fully extended and locked position. This generates good resistance to shear forces and impact during use, yet also allows collapsibility for a much-reduced storage volume of the case 100.

A Kevlar cord is recommended to form mesh 332 and 334 due to its abrasion and cut resistance, resistance to heat, chemicals and almost negligible rate of stretch. This ensures the mesh maintains a high rate of tension over time, both in the static side mesh 332 and dynamic perimeter mesh 334.

The tensioned and woven side mesh 332 provides shear strength in a vertical plane along the length of struts 316, 400 and 318. The perimeter mesh 334 provides shear strength parallel to cross struts 328 and 328a, Thus, shear force applied in any plane to inner frame 200 is counteracted.

This highly tensioned cordage system greatly increases tubular frame shear strength, with a negligible increase in weight compared to adding diagonal struts in metal or similar rigid materials. The flexible nature of the cordage works symbiotically with the rigid cross struts 328 and 328a, only requiring the user to unfold and lock them using hinge 330 to produce a fully assembled inner frame 200.

A highly tensioned mesh thus envelopes the entire structure providing a closely woven net that functions also to provide impact and penetration resistance to the delicate contents of the case. With the fabric cover 100 supported underneath by this gridwork of mesh, the deflection of the cover 100 is decreased to the spacing of the mesh gridwork. The tubular inner frame 200, mesh panels 336 and 332, and fabric cover 102 each act to protect against different types and sizes of forces that each component alone cannot provide.

With the fabric cover 102 unzipped for inspection by TSA agents as in FIG. 2, or with cover 102 further removed from inner frame 200, the case 100 is fully transparent for detailed inspection, while the contents are still maximally protected. It should be noted that no additional packing materials, zippered wheel bags or fabric sleeves are required to further protect the disassembled bicycle, providing complete transparency throughout the entire case 100.

The highly porous structure produced also outperforms transparent solid sheets or clear fabric panels by allowing sniffer dogs and other drug testing procedures, Field testing has proven simply removing cover 102 satisfies TSA inspection requirements, obviating the need to open the inner frame 200. Thus, the combined outcome of these individual components synergistically produces a solution to the problem I identified with the prior art.

Should the need arise to open the case further during transit or TSA inspection, this can be achieved by releasing the latches 702 that are present in both sets of block 302 to 304 connections. Latch access hole 710 facilitates this yet ensures that latch 702 is not released accidentally. With latches 702 disengaged from bar 700, upper section 426 pivots on pins 910 that connect blocks 306 and 308 together. Tether line 422 supports the upper section 426 in the open position as shown in FIG. 4. This reduces the amount of floor space needed to open the case, both in packing the bicycle and if the need arises for TSA to open it.

When upper section 426 is lowered from the position shown in FIG. 4 to form inner frame 200 into the closed arrangement in FIG. 3, the weight of upper section 426 causes hinge 702 to strike bar 700 and compress spring 706 until the curved end of 702 has traversed around bar 700 and nestles underneath bar 700. Spring 706 pushes against 702, maintaining this connection. Thus, frame 200 is latched automatically when section 426 is lowered, so the possibility of improper closing, resulting in damage to the contents of case 100 in further transit is nullified.

When horizontal tethers 420 are connected and tensioned via 336 as shown in FIG. 4, handlebar 406 is prevented from rotating clockwise or anticlockwise. Vertical tethers 418 work in unison with springs 1422 shown in FIG. 14 through 18b. Considering FIG. 18, fork 416 has rotated to the right, mirroring movement of handlebar 406 to the right caused by case 100 being tipped over to the right. This movement is allowed by the rotation of rod 1518 inside tube 1424 and rod 1704 inside tube 1702 if case 100 is pushed over or thrown sideways. FIGS. 18 and 18b should be studied in unison as they illustrate how simultaneous rotation of front fork 416 and rear fork 410 is accommodated. Tethers 418 limit this rotation to a safe amount and provide a dampening effect to the forces generated.

If case 100 is dropped vertically, springs 1422 mounted on rails 1400 and 1600 compress to cushion bicycle forks 416 and 410, causing rods 1516 to travel downwards through rail 1400 and 1600. Springs 1422 then return to their original position.

If the mounts for forks 416 and 410 are only designed to protect against vertical dropping, this renders the shock absorbing mechanism useless if the case is tipped sideways and very large inertial forces will be transmitted to the bicycle forks 416 and 410 with a high probability of permanent damage. This is a very likely scenario during airline travel. If a completely fixed mount is provided for forks 416 and 410, this transfers excessive forces to them when case 100 is thrown sideways as well as when it is dropped, with high potential for damage. Independent operability of the springs 1422 on rails 1400 and 1600 allow for the case being dropped in a non-horizontal orientation.

To install a bicycle frame 408 in a fully assembled inner frame 200 shown in the open position of FIG. 4, pedals are removed from the bicycle and installed on pedal mount 1402. Bicycle wheels 404 are removed from the bicycle frame 408, and forks 410 and 416 are installed on bushings 1510 located in tubes 1606 and 1426 using the quick release type mounts supplied with bicycle forks 410 and 416. Standoff 1512 and 1700 are located over them as per FIGS. 18 and 18b. Sleeve 1420 is threaded onto mount 1514 by hand. It is a particular advantage of sleeve 1420 used in multiple locations in frame 200 that no tools are required to install or remove it.

Bicycle chain 1802 is located on sprocket 1610. This keeps the chain 1802 under tension, preventing it from damaging frame 408 or fork 410, a problem typical of prior art cases.

Vertical tethers 418 and horizontal tethers 420 are installed over handlebars 406 and tensioned using adjuster 336.

To fasten bicycle wheels 404 into lower section 424 as shown in FIG. 4 and enlarged in FIG. 13, skewer rod 1312 is fed through block 1300 that has mounting post 1308, through the appropriate sequence of sleeves 1310 alternated with wheels 404 and pushed through the second block 1300. Skewer nut 1302 is then threaded onto the non-handle end of rod 1312. Handle 1304 is closed, then plate 1306 installed.

Locating block 1300 vertically in line with connectors 310 and crush struts 402 as per FIG. 3 provides a continuous solid assembly to resist vertical loads in the middle of the frame 200. With spacer sleeves 1310 and bicycle wheels 404 forming a continuous assembly along skewer 1312, this provides a wheel mount that prevents bicycle wheels 404 from damaging frame 408.

Compared to prior art cases that predominantly use sleeves or pockets to contain bicycle wheels, this method is much easier for TSA to inspect, obviating the need for them to unpack components. An added advantage of this embodiment is it forms a horizontal assembly across the midpoint of frame 200 to resist sideways crushing forces.

A safety chain 804 is dedicated to upper section 426 to lock pins 910 into upper hinges 330 and lower hinge blocks 308. A separate chain 804 is dedicated to lower section 424 for locking pins 910 in lower hinges 330 and all sleeves 1420 into studs 1418 and 1514. Chain 804 for lower section 424 also locks plate 1306 to post 1308.

Thus, even with the case opened the likelihood of damage due to bicycle components being removed from the case or reinstalled improperly, or the inner frame 200 being tampered with is negated. This offers yet another layer of protection compared to the prior art.

To fold the bicycle case 100 for storage, FIG. 3 and FIG. 4 are used as a starting point. All bicycle components need to be removed from the inner frame 200. With the upper section 426 raised, safety chain 804 in lower section 424 is detached from adjuster 336 that links the ends of chain 804 together, and chain 804 is removed from all safety sleeves 1420, pins 910 and post 1308. The process is repeated with chain 804 in upper section 426. Then all bicycle components are removed, and upper section 426 is closed to enable removal of pin 910 from blocks 306 and 308, separating the case 100 into two sections. Cover 102 (not shown in FIG. 4) is easily removed by detaching hook and loop tabs 202 from lower rails 316.

To remove cross rails 414 and 412 from lower section 424, sleeves 1420 are unscrewed from threaded studs 1418 and cross rails 414 and 412 lifted out of lower section 424. Sleeves 1420 may then be screwed back onto stud 1418 for storage.

Referring to FIG. 9, pin 910 that locks strut 328a into plates 904 is removed from all hinges 330. Upper section 426 and lower section 424 can then be transformed into the folded arrangement of FIG. 5. Hinges 330 should be incrementally folded working around the perimeter of 424 and 426 until both sections are fully flattened. Attempting to fully collapse each hinge 330 at a time could damage them.

Given the tapered shape of inner frame 200, with pin 910 still engaged through plates 904 and pivot block 906 of FIG. 9, struts 400, 316 and 318 will still exhibit a tapered arrangement relative to each other, as can be seen in FIG. 5. It is possible to further collapse sections 424 and 426 completely flat such that struts 400, 316 and 318 are parallel to each other by removing pin 910 from block 906 as well. This will allow strut 328a to be disconnected from strut 328.

All removed pins 910 can be stored on safety chains 804 to prevent them being misplaced. The reusable nature of the GRIPPLE® recommended for adjuster 336 in this embodiment lends itself well to the removal and reinstallation of chain 804. It is further advantageous because it requires a removal tool to disengage it, thereby ensuring it cannot be tampered with in transit.

Thus, the features that case 100 includes offers significant advantages over the prior art in the areas of increased levels of protection combined with a lightweight structure, collapsibility for storage and transport when not in use, and multiple features that allow inspection by TSA during airline travel that surpass the functionality of prior art devices.

CONCLUSION, RAMIFICATIONS AND SCOPE

Thus, the reader will see that at least one embodiment of the bicycle travel case provides a more reliable, lightweight device that has advantages over prior art cases. While my above description contains many specificities, these should not be construed as limitations on the scope, but rather as an example of multiple embodiments. Many other variations are possible. For example, the case may be produced in a non-folding arrangement, or it may be produced in a permutation that also allows rails supporting side mesh 332 to be folded as well.

It may also be produced in an arrangement hinged about a vertical axis, hinged about a sloped plane, hinged in such a manner to produce unequal sized sections, or in an embodiment that has an access panel, or multiple panels on any plane for installation or removal of the bicycle. Further embodiments could also include a model without a cover over the inner frame, or a model with clear panels of rigid or non-rigid material to replace mesh panels. Mesh panels may also be provided in any number or woven arrangement different from that in this embodiment.

The fork mounts may be produced in an embodiment not offering shock absorption capabilities, or alternatively the shock absorption and rotating mechanisms may be interchanged between the front and rear mount orientation specified in this embodiment. Similarly, the slidable positioning mechanism to allow different sized bicycle frames to be installed can be located on the front mount rather than the rear mount.

Accordingly, the scope of the disclosure should be determined not by the embodiment illustrated, but by the appended claims and their legal equivalents.

What is claimed is:

1. A bicycle travel case comprising:
   a) an inner framework forming a rigid perimeter of said case;
   b) an arrangement of mesh panels mounted between said inner framework such that said mesh panels form a reticulum gridwork defining substantially vertical and horizontal planar surfaces bounded by said inner framework;
   c) a cover that surrounds said inner framework and said mesh panels;
   d) a pair of mounts to fasten a front fork and a rear fork of said bicycle to said inner framework; and
   e) at least one mounting skewer to position bicycle wheels of said bicycle inside said case; whereby said inner framework supporting said arrangement of said mesh panels provides visual transparency and air permeability simultaneously with minimal loss of protection to said bicycle when said cover is removed.

2. The bicycle travel case of claim 1, wherein said inner framework comprises straight tubular rails linked with connector blocks formed into a pair of substantially vertical rectangular shaped arrangements positioned in a non-parallel arrangement and linked together by a plurality of cross strut tubes.

3. The bicycle travel case of claim 2, wherein said cross strut tubes form an assemblage linked by a cross strut tube hinge at a midpoint between said substantially vertical rectangular shaped arrangements and said assemblage includes a first end and a second end, a releasably lockable pin is used for securing said cross strut tube hinge in a fully opened position, and wherein said assemblage is rotatably interconnected with said pair of vertical rectangular arrangements at said first end and said second end.

4. The bicycle travel case of claim 1, wherein said framework is divided into a lower section and an upper section, said upper section and said lower section being contiguous, with a hinged framework connection and a latching framework connection at opposing ends of an axis joining said lower and said upper sections together.

5. The bicycle travel case of claim 4, said latching framework connection further including a spring-loaded latching lever acting about a pivot point to engage with a latching bar whereby said latching framework connection is self-latching when said upper section is rotated about said hinged framework connection into a contiguous position with said lower section.

6. The bicycle travel case of claim 5, said latching framework connection further including a means for shrouding said latching bar, whereby unintended disengagement of said latching framework connection is prevented.

7. The bicycle travel case of claim 1, said at least one mounting skewer further including a plurality of spacers to position said bicycle wheels such that said bicycle wheels do not contact a frame of the bicycle.

8. The bicycle travel case of claim 7, said at least one mounting skewer further including a releasably lockable means of securing said at least one mounting skewer.

9. The bicycle travel case of claim 1, wherein at least one of said mounts incorporates a means for slidable positioning to vary to a distance between said mounts.

10. The bicycle travel case of claim 1, said mounts further including a plurality of springs providing a variable vertical height relationship between said forks and said mounts whereby said bicycle is isolated from vertical forces exerted upon said case.

11. The bicycle travel case of claim 1, said mounts further including rotational means allowing said front and rear forks to exhibit a variable clockwise or anticlockwise positioning relationship perpendicular with an axis formed between said forks, whereby said bicycle is isolated from horizontal forces and rotational inertia.

12. The bicycle travel case of claim 11, said mounts further including tethers configured to be mounted to a handlebar of said bicycle whereby clockwise and anticlockwise rotation of said forks perpendicular to the axis formed between said mounts is dampened.

13. The bicycle travel case of claim 1, wherein said mounts are installed in said inner framework using a releasably lockable means.

14. The bicycle travel case of claim 1, wherein said mounts secure said forks using a releasably lockable means, whereby said bicycle is configured to only be removed from said case by an authorized user.

15. The bicycle travel case of claim 1, wherein said mesh panels are tensioned, whereby said planar surfaces form an impact resistant gridwork and counteract diagonal forces acting on said inner framework.

16. The bicycle travel case of claim 1, further including a plurality of bicycle case wheels mounted to said inner framework, whereby said case is rollable for transportation.

17. The bicycle travel case of claim 1, said cover further including a plurality of handles, whereby said case is configured to be lifted and pulled.

18. A method of packaging a bicycle for transportation including the steps of:
  a) removing bicycle wheels from a frame of said bicycle; and
  b) connecting said frame and said bicycle wheels to a bicycle travel case that has an inner framework forming a rigid perimeter, an arrangement of mesh panels forming substantially planar surfaces defined by said inner framework, a pair of mounts to fasten a front fork and a rear fork of said bicycle to said inner framework, at least one mounting skewer to position said bicycle wheels inside said case, and a cover that surrounds said inner framework and said mesh panels by:
  c) releasably engaging the front fork and the rear fork of said frame with said mounts; and
  d) installing said bicycle wheels on said at least one mounting skewer.

19. A bicycle travel case comprising:
  a) an inner framework forming a rigid perimeter of said case;
  b) an arrangement of mesh panels mounted between said inner framework such that said mesh panels form a reticulum gridwork defining substantially vertical and horizontal planar surfaces bounded by said inner framework;
  c) a pair of mounts to fasten a front fork and a rear fork of a bicycle to said inner framework; and
  d) at least one mounting skewer to position bicycle wheels of said bicycle inside said case whereby said inner framework supporting said arrangement of said mesh panels provides visual transparency and air permeability simultaneously; and
  e) a cover that surrounds said inner framework and said mesh panels.

* * * * *